(12) United States Patent
Itokawa

(10) Patent No.: US 6,810,079 B2
(45) Date of Patent: Oct. 26, 2004

(54) IMAGE PROCESSING APPARATUS, IMAGE PROCESSING METHOD, AND COMPUTER-READABLE STORAGE MEDIUM STORING THEREON PROGRAM FOR EXECUTING IMAGE PROCESSING

(75) Inventor: Osamu Itokawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 623 days.

(21) Appl. No.: 09/928,333

(22) Filed: Aug. 14, 2001

(65) Prior Publication Data

US 2002/0080425 A1 Jun. 27, 2002

(30) Foreign Application Priority Data

Aug. 14, 2000 (JP) ........................................ 2000-245560

(51) Int. Cl.[7] .............................. H04N 7/12; G06K 9/36
(52) U.S. Cl. .............................. 375/240.08; 348/399.1; 382/243
(58) Field of Search ....................... 375/240.08, 240.09, 375/240.16, 240.24; 348/399.1, 420.1, 422.1, 414.1, 415.1; 382/242, 243, 266

(56) References Cited

U.S. PATENT DOCUMENTS 6,546,117 B1 * 4/2003 Sun et al. .................... 382/103
6,560,281 B1 * 5/2003 Black et al. ................. 375/240
6,650,778 B1 * 11/2003 Matsugu et al. ............ 382/209

OTHER PUBLICATIONS

Kass, M., et al., "Snakes: Active Contour Models", International Journal of Computer Vision, vol. 1, No. 4, 1987, pp. 321–331.

* cited by examiner

*Primary Examiner*—Gims Philippe
(74) *Attorney, Agent, or Firm*—Fitzpatrick, Cella, Harper & Scinto

(57) ABSTRACT

A specific frame is selected from a plurality of frames of moving image data, and an initial contour corresponding to an extraction target is generated in the selected frame. The initial contour is converged to the contour of the extraction target. An initial contour corresponding to the extraction target is set in an other frame on the basis of the result of the convergence. Contour convergence to the contour of the extraction target is effected on the basis of the set initial contour. As the other frame, frames preceding and subsequent to the selected frame with respect to time can be set.

56 Claims, 31 Drawing Sheets

IMAGE PROCESSING APPARATUS, IMAGE PROCESSING METHOD, AND COMPUTER-READABLE STORAGE MEDIUM STORING THEREON PROGRAM FOR EXECUTING IMAGE PROCESSING

BACKGROUND OF THE INVENTION

1. Field of the Invention

The present invention relates to an image processing apparatus, an image processing method, and a computer-readable storage medium on which a program for executing image processing is stored, and specifically, to processing for extracting a particular object from frames of moving image data.

2. Related Background Art

In recent years, coding systems have been studied in which a moving picture is grasped as a synthesis of components called objects, and in which compression coding is performed on an object basis. Standardization of such systems known as Moving Picture Experts Group Phase 4 (MPEG-4) is being advanced. A moving picture object can have any shape and is expressed by a combination of data called "shape" representing information on the shape and data called "texture" representing the contents of the image.

Known object generation methods include a chroma key separation method using a studio set, etc., a method for generating a desired object by computer graphics (CG), and a method of extracting an object from a natural image.

The chroma key separation method adopts a process in which a uniform blue background called a blue back is prepared in a studio, an image including the blue back is photographed, and a desired object is extracted from the photographed image by removing the blue portion.

An essential feature of computer graphics resides in freely generating an image in any shape and, therefore, it is not necessary to pay a special attention to an extraction processing when computer graphics is used. Animation images can be processed in the same manner as CG images if each of cell images (images on celluloid sheets) is regarded as an object.

As a means for extracting an object from a natural image, the method of minimizing energy of an active contour model called "Snakes" (see, for example, Michael Kass, Andrew Witkin, and Demetri Terzopoulos, "Snakes: Active Contour Models", International Journal of Computer Vision, Vol. 1, No. 3, pp. 321–331, 1988) is well known.

In snakes representation, an energy function which minimizes when a contour is extracted is defined and its minimal solution is obtained by iterative calculation from a suitable initial value. The energy function is defined as the linear sum of external energy provided as constraints on passing through edge points and internal energy provided as constraints on smoothness.

To use a snake, it is necessary to roughly designate a contour of an extraction target as an initial contour. In processing a moving picture, setting of an initial contour is required with respect to each frame. However, automatization of processing can be achieved by setting the results of extraction from the previous frame as initial values in the current frame. A technique for obtaining corresponding contour lines between frames is called tracking.

Each of the above-described extraction methods entails a problem difficult to solve. That is, the chroma key method requires a uniform background color and, hence, a large-scale studio set if a high extraction accuracy is specified. Also, if an object extraction target contains the background color, the target cannot be correctly extracted. Therefore the selection of colors of targets is restricted.

Computer graphics and animation can be used without extraction processing but have a fatal drawback of being incapable of processing natural images such as those in pictures taken by video cameras.

The methods of extracting objects from natural images have the advantage of reducing restrictions on image contents and having high versatility but have the drawback of requiring designation of initial contours with certain accuracy. This is because a minimal solution of an active contour model is largely influenced by an initial contour. That is, if an initial contour differs largely from the actual contour of an object, the convergent result of calculation does not match the actual contour of the object. Ordinarily, initial contour setting is made by a user using a graphical user interface (GUI) including a mouse or the like. The operability of the process of manually setting an initial contour is low and it is difficult to manually make a sufficiently reproducible initial contour setting. The burden on the user in manually setting an initial contour becomes larger as the shape of the contour becomes more complicated.

As a solution to this problem, a method for automatically generating an initial contour may be used. Use of information on movements between frames as well as information on colors and textures in frames is effective in automatically extracting an initial contour. To use such movement information, however, it is necessary that relative movements between the extraction target and the background be detected.

This problem will be described in more detail with reference to FIG. 1. FIG. 1 is a diagram schematically showing movements of objects between frames in a moving picture sequence. Frames F1 to F6 appear successively with passage of time. Frame F1 is a start frame and frame F6 is an end frame. Start frame F1 and the next frame F2 have completely the same internal configurations with no movement of the subject or the background. In this case, since the background and the object are equal in movement, the object cannot be extracted even if processing for obtaining the amount of movement between the frames is performed. Processing ends with the same result in a case where the camera is panned when both the background and the object are at rest.

If a frame remote from the start frame with respect to time, e.g., frame F4 is referred to instead of the adjacent frame, the possibility of success in detecting a relative movement between the object and the background is increased. In such a case, however, it is difficult to recognize the correspondence between the images of the background and between the images of the object if the search range is not increased. This is because, if the time interval is increased, the possibility of increase of a change in shape is high. Consequently, the method of setting an initial contour by obtaining a movement from the start frame is rather low in versatility and entails difficulty in obtaining good results in subsequent tracking. Also, the method of setting an initial contour by obtaining a movement from the start frame does not always ensure good extraction results.

SUMMARY OF THE INVENTION

According to the above-mentioned background, an object of the present invention is to provide an image processing apparatus, which facilitates user operation and can extract objects more correctly from frames of moving image data, and an image processing method and a computer-readable storage medium on which a program for executing image processing is stored.

An image processing method according to a preferred embodiment of the present invention is characterized in that the method comprises: a selection step of selecting a particular frame from a plurality of frames of moving image data; a generation step of generating an initial contour corresponding to an extraction target in the frame selected in the selection step; a convergence step of converging the initial contour to the contour of the extraction target; and a control step of setting an initial contour corresponding to the extraction target in an other frame on the basis of the result of convergence in the convergence step, and effecting convergence to the contour of the extraction target on the basis of the set initial contour, wherein, in the control step, frames preceding and subsequent to the selected frame with respect to time can be set as the other frame.

Further, according to an another preferred embodiment of the present invention, there is provided an image processing method comprising: a generation step of generating an initial contour in each of a plurality of frames of moving image data; a selection step of selecting the initial contour in specific one of the frames from the initial contours generated in the frames in the generation step; a convergence step of converging the initial contour in the selected frame to the contour of an extraction target; and a control step of setting an initial contour corresponding to the extraction target in an other frame on the basis of the result of convergence in the convergence step, and effecting convergence to the contour of the extraction target on the basis of the set initial contour, wherein, in the control step, frames preceding and subsequent to the selected frame with respect to time can be set as the other frame.

Further, according to an another preferred embodiment of the present invention, there is provided an image processing method comprises: a generation step of generating an initial contour in each of a plurality of frames of moving image data; a convergence step of converging the initial contour in each frame to the contour of an extraction target; a selection step of selecting a specific frame from the contours in the frames converged in the convergence step; and a control step of setting an initial contour corresponding to the extraction target in an other frames on the basis of the result of contour convergence in the selected frame, and effecting convergence to the contour of the extraction target on the basis of the set initial contour, wherein, in the control step, frames preceding and subsequent to the selected frame with respect to time can be set as the other frame.

According to a still preferred embodiment of the present invention, there is provided an image processing method comprising: a generation step of generating an initial contour in each of a plurality of frames of moving image data; a convergence step of converging the initial contour in each frame to the contour of an extraction target; a control step of setting an initial contour corresponding to the extraction target in an other frame on the basis of the result of contour convergence in each frame, and effecting convergence to the contour of the extraction target on the basis of the set initial contour; and a selection step of selecting a specific result from the convergence results relating to the other frame on the basis of the result of contour convergence in each frame, wherein frames preceding and subsequent to the selected frame with respect to time can be set as the other frame.

According to a still another preferred embodiment of the present invention, there is provided an image processing method comprises: an input step of inputting a plurality of frames of moving image data; a selection step of selecting a specific one of the plurality of frames; and an extraction step of extracting image data of a desired object from the frames in the direction from the specific frame to a frame preceding the specific frame with respect to time and in the direction from the specific frame to a frame subsequent to the specific frame with respect to time.

According to a still another preferred embodiment of the present invention, there is provided an image processing apparatus comprises: selection means for selecting a specific frame from a plurality of frames of moving image data; generation means for generating an initial contour corresponding to an extraction target in the frame selected by the selection means; convergence means for converging the initial contour to the contour of the extraction target; and control means for setting an initial contour corresponding to the extraction target in an other frame on the basis of an output from the convergence means, and for effecting convergence to the contour of the extraction target on the basis of the set initial contour, wherein the control means can set frames preceding and subsequent to the selected frame with respect to time as the other frame.

According to a still another preferred embodiment of the present invention, there is provided an image processing apparatus comprises: generation means for generating an initial contour in each of a plurality of frames of moving image data; selection means for selecting the initial contour in specific one of the frames from the initial contours generated in the frames by the generation means; convergence means for converging the initial contour in the selected frame to the contour of an extraction target; and control means for setting an initial contour corresponding to the extraction target in an other frame on the basis of an output from the convergence means, and for effecting convergence to the contour of the extraction target on the basis of the set initial contour, wherein the control means can set frames preceding and subsequent to the selected frame with respect to time as the other frame.

According to a still another preferred embodiment of the present invention, there is provided an image processing apparatus comprises: generation means for generating an initial contour in each of a plurality of frames of moving image data; convergence means for converging the initial contour in each frame to the contour of an extraction target; selection means for selecting a specific frame from the contours in the frames converged by the convergence means; and control means for setting an initial contour corresponding to the extraction target in an other frame on the basis of the result of contour convergence in the selected frame, and for effecting convergence to the contour of the extraction target on the basis of the set initial contour, wherein the control means can set frames preceding and subsequent to the selected frame with respect to time as the other frames.

According to a still another preferred embodiment of the present invention, there is provided an image processing apparatus comprises: generation means for generating an initial contour in an a plurality of frames of moving image data; convergence means for converging the initial contour in each frame to the contour of an extraction target; control means for setting an initial contour corresponding to the extraction target in an other frame on the basis of the result of contour convergence in each frame, and for effecting convergence to the contour of the extraction target on the basis of the set initial contour; and selection means for selecting a specific result from the convergence results relating to the other frame on the basis of the result of contour convergence in each frame, wherein the control means is capable of setting frames preceding and subsequent to the selected frame with respect to time as the other frames.

According to a still another preferred embodiment of the present invention, there is provided an image processing apparatus comprises: input means for inputting a plurality of frames of moving image data; selection means for selecting specific one of the plurality of frames; and extraction means for extracting image data of a desired object from frames in the direction from the specific frame to a frame preceding the specific frame with respect to time and in the direction from the specific frame to a frame subsequent to the specific frame with respect to time.

Further, according to an another preferred embodiment of the present invention, there is provided a computer-readable storage medium stores: a code for a selection step of selecting a specific frame from a plurality of frames of moving image data; a code for a generation step of generating an initial contour corresponding to an extraction target in the frame selected in the selection step; a code for a convergence step of converging the initial contour to the contour of the extraction target; and a code for a control step of setting an initial contour corresponding to the extraction target in an other frame on the basis of the result of convergence in the convergence step, and effecting convergence to the contour of the extraction target on the basis of the set initial contour, wherein, in the control step, frames preceding and subsequent to the selected frame with respect to time can be set as the other frame.

According to a still another preferred embodiment of the present invention, there is provided a computer-readable storage medium stores: a code for a generation step of generating an initial contour in an a plurality of frames of moving image data; a code for a selection step of selecting the initial contour in specific one of the frames from the initial contours generated in the frames in the generation step; a code for a convergence step of converging the initial contour in the selected frame to the contour of an extraction target; and a code for a control step of setting an initial contour corresponding to the extraction target in an other frame on the basis of the result of convergence in the convergence step, and effecting convergence to the contour of the extraction target on the basis of the set initial contour, wherein, in the control step, frames preceding and subsequent to the selected frame with respect to time can be set as the other frame.

According to a still another preferred embodiment of the present invention, there is provided a computer-readable storage medium stores: a code for a generation step of generating an initial contour in an a plurality of frames of moving image data; a code for a convergence step of converging the initial contour in each frame to the contour of an extraction target; a code for a selection step of selecting a specific frame from the contours in the frames converged in the convergence step; and a code for a control step of setting an initial contour corresponding to the extraction target in an other frame on the basis of the result of contour convergence in the selected frame, and effecting convergence to the contour of the extraction target on the basis of the set initial contour, wherein, in the control step, frames preceding and subsequent to the selected frame with respect to time can be set as the other frame.

According to a still another preferred embodiment of the present invention, there is provided a computer-readable storage medium stores: a code for a generation step of generating an initial contour in an a plurality of frames of moving image data; a code for a convergence step of converging the initial contour in each frame to the contour of an extraction target; a code for a control step of setting an initial contour corresponding to the extraction target in an other frame on the basis of the result of contour convergence in each frame, and effecting convergence to the contour of the extraction target on the basis of the set initial contour; and a code for a selection step of selecting a specific result from the convergence results relating to the other frame on the basis of the result of contour convergence in each frame, wherein frames preceding and subsequent to the selected frame with respect to time can be set as the other frame.

According to a still another preferred embodiment of the present invention, there is provided computer-readable storage medium stores: a code for an input step of inputting a plurality of frames of moving image data; a code for a selection step of selecting specific one of the plurality of frames; and a code for an extraction step of extracting image data of a desired object from frames in the direction from the specific frame to a frame preceding the specific frame with respect to time and in the direction from the specific frame to a frame subsequent to the specific frame with respect to time.

Other objects, features and advantages of the invention will become apparent from the following detailed description taken in conjunction with the accompanying drawings.

DESCRIPTION OF THE PREFERRED EMBODIMENTS

Embodiments of the present invention will be described below in detail with reference to the accompanying drawings.

Figure 2:
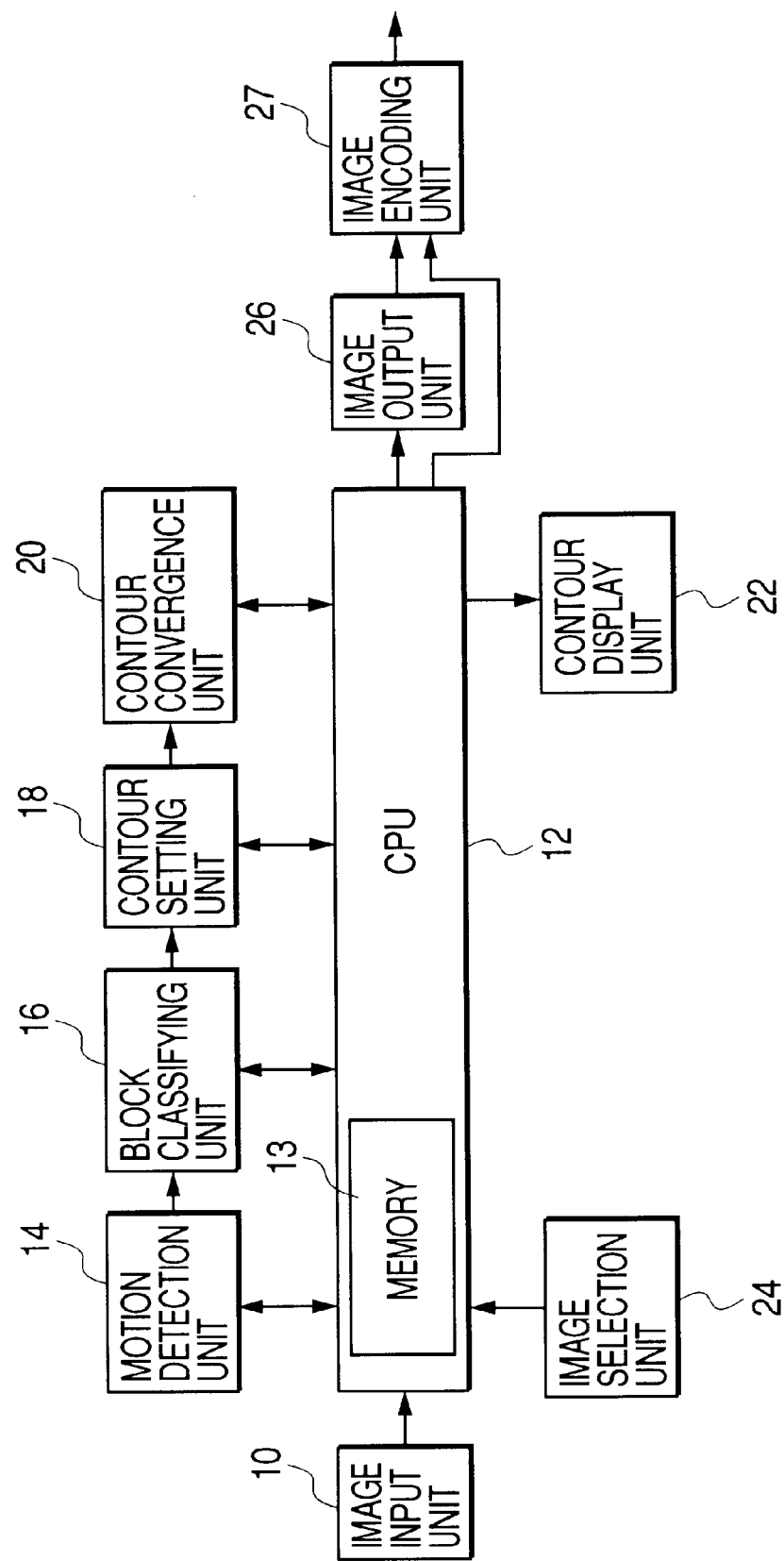
FIG. 2 is a block diagram showing the configuration of an image processing apparatus which represents a first embodiment of the present invention.

FIG. 2 is a block diagram schematically showing the configuration of an image processing apparatus which represents a first embodiment of the present invention.

Referring to FIG. 2, an image input unit 10, which is constituted by a video camera, an image reproducing device, or the like, supplies moving image data to a central processing unit (CPU) 12. The CPU 12 controls each unit in the image processing apparatus and has a memory 13 for temporarily storing several frames of moving image data input through the image input unit 10.

A motion detection unit 14 detects amounts of motion of image portions in a currently-processed frame from a plurality of frames of image data stored in the memory 13. A block classifying unit 16 classifies blocks in the currently-processed frame into background portions and portions corresponding to an object according to detection results from the motion detection unit 14. A contour setting unit 18 sets an initial contour at the boundaries between background portions and object portions according to classification results from the block classifying unit 16.

A contour convergence unit 20 converges the initial contour set by the contour setting unit 18 into a shape close to the actual contour of the object. The converged contour is transferred to a contour display unit 22 through the memory 13 to be displayed thereon. A user checks the convergence result displayed on the contour display unit 22. When determining that the displayed contour convergence result is unsatisfactory, the user initiates redoing of contour convergence with the contour convergence unit 20 by changing the currently-processed frame through an image selection unit 24.

If the contour convergence result is satisfactory, the currently-processed frame is set as a reference frame. When the reference frame is determined, the contour setting unit 18 sets the reference frame convergence result as an initial contour in an the adjacent frames, and the contour convergence unit 20 effects contour convergence in the adjacent frame. This processing is executed in an the two directions, i.e., the direction toward the end frame and the direction toward the start frame. Finally, the contours of the objects in all the frames are determined. An image output unit 26 outputs the thus-obtained results as contour data or mask data on contents inside and outside the object. An image encoding unit 27 encodes data on an object basis according to the output from the image output unit and moving image data read out from the memory 13. The image encoding unit 27 executes encoding in accordance with the Moving Picture Experts Group Phase 4 (MPEG-4) coding system.

Figure 3:
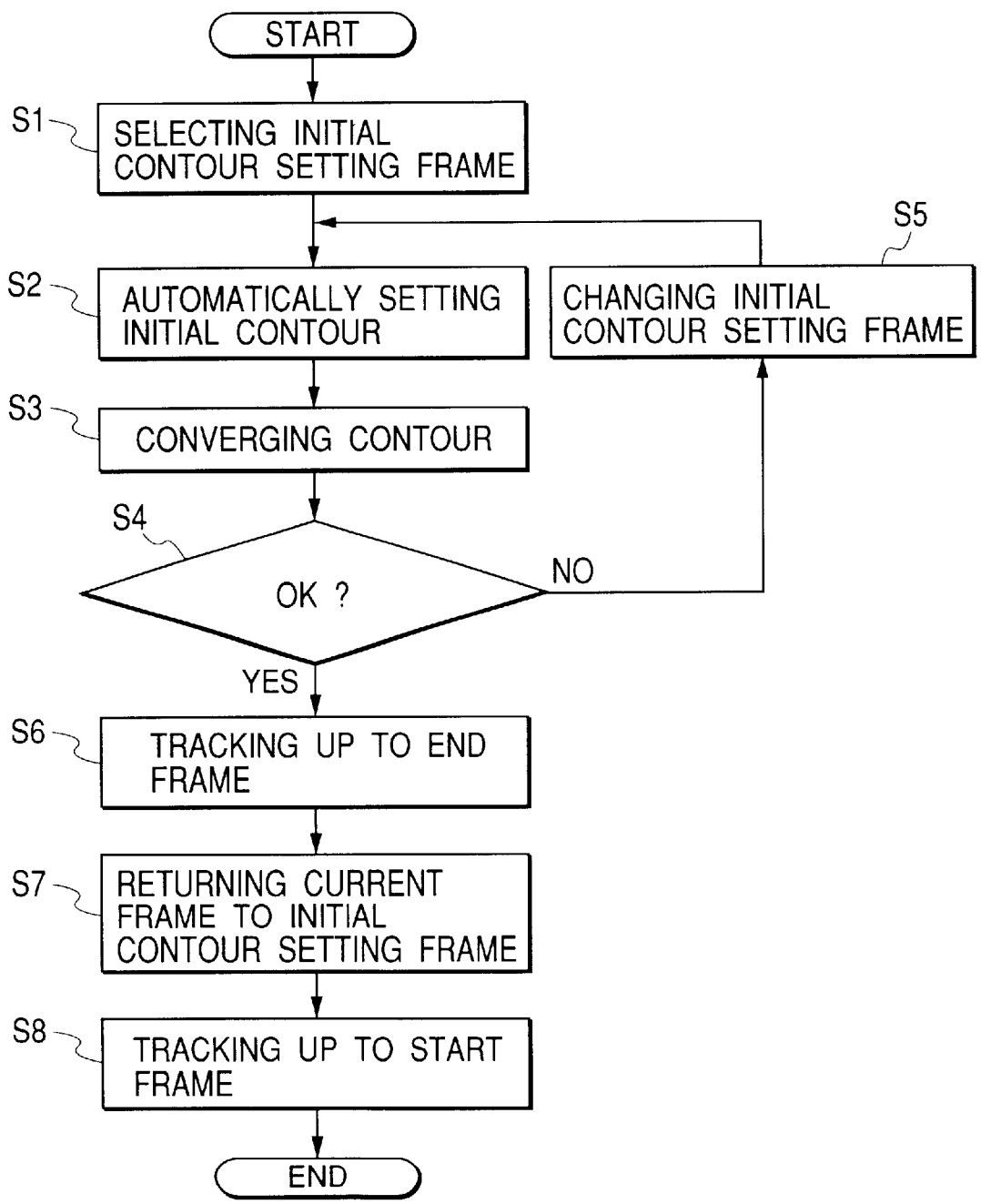
FIG. 3 is a flowchart of an object extraction process in the first embodiment of the present invention.

FIG. 3 is a flowchart of an object extraction process in the first embodiment of the present invention.

From all frames, one for setting an initial contour is selected (S1). An initial contour corresponding to an object is set by automatic processing with respect to the selected frame (S2) and is converged to the actual contour (S3). To converge the contour, an active contour model is used. If the convergence result is unsatisfactory (S4), the initial contour setting frame is changed to another frame and setting of an initial contour and convergence of the contour are repeated (S2, S3). Contour convergence conditions may be changed while the same contour setting frame is used.

If the convergence result is satisfactory (S4), the initial contour setting frame is set as a reference frame and tracking up to the end frame is executed (S6). Thereafter, the current frame is returned to the initial contour setting frame (S7) and tracking up to the start frame is executed with the initial contour setting frame set as a reference frame (S8). The object is thus extracted from all the frames from the start frame to the end frame. Needless to say, the same extraction result is also obtained when tracking from the reference frame to the end frame is executed after execution of tracking from the reference frame to the start frame.

Figure 4:
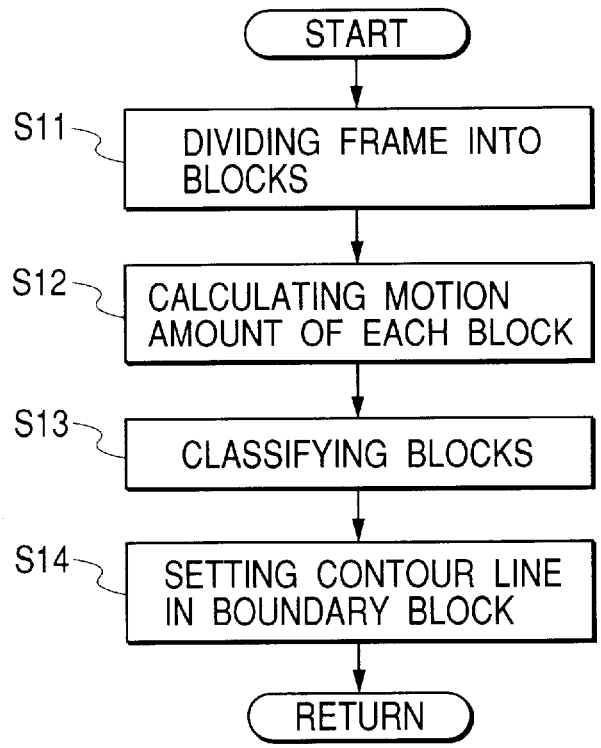
FIG. 4 is a flowchart showing details of automatic initial contour setting (S2) shown in FIG. 3.

FIG. 4 is a flowchart showing details of automatic initial contour setting (S2) shown in FIG. 3.

Figure 5:
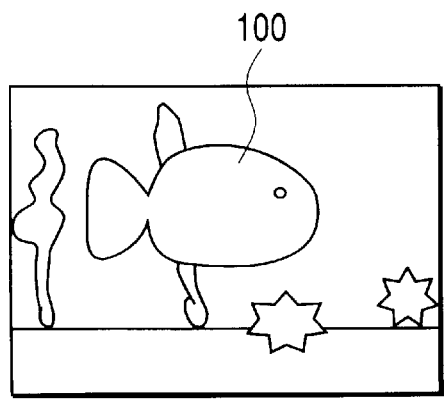
FIG. 5 is a diagram showing an example of a frame processed in automatic initial contour setting.
Figure 6:
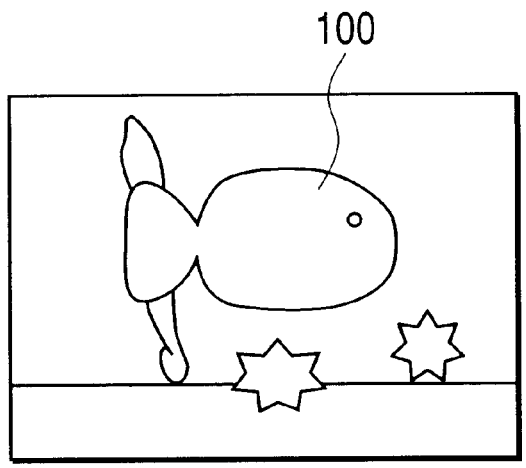
FIG. 6 is a diagram showing a frame which follows the frame shown in FIG. 5.

FIGS. 5 through 10 show frames and an example of processing of the frames. FIG. 5 shows an example of a frame selected as an object of automatic initial contour setting processing. FIG. 6 shows a frame which follows the frame shown in FIG. 5. FIGS. 7 to 10 are diagrams for explaining processing for automatic initial contour setting.

Figure 7:
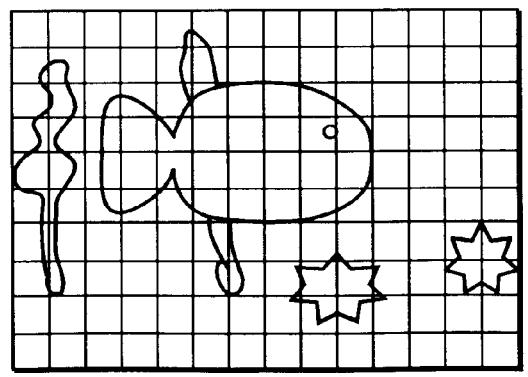
FIG. 7 is a diagram showing an example of block division.

The frame to be processed (FIG. 5) is divided into blocks of a predetermined size as shown in FIG. 7 (S11) and the amount of motion of each block is calculated (S12). The calculation of the amount of motion is a process in which the position in the next frame (FIG. 6) to which each block of the processed frame corresponds is identified by a method generally known as block pattern matching, and the shift of each block from the corresponding position in the frame is obtained as a motion vector. A function for evaluating a match in pattern matching is, for example, addition of the squares of the differences between the blocks or addition of the absolute values of the differences.

After motion vectors have been obtained with respect to all the blocks, the blocks are classified according to the values of the motion vectors (S13). In the example of the frames shown in FIGS. 5 and 6, the background moves to the left-hand side of the frame and the object (fish 100) moves to the right relative to the background. Among the classified motion vector groups in an which the values of the motion vectors are approximate to each other, background blocks moving to the left can be extracted as the largest number of blocks, and blocks moving to the right and corresponding to the object can be extracted as the second largest number of blocks.

If a block contains both a background portion and an object portion, no corresponding region can be obtained from the next frame, and such the block may have a value different from those of the background blocks and the object blocks. In this embodiment, such the block is regarded as a boundary block between the object blocks and the background blocks. The boundary blocks are further divided into smaller blocks, which are classified according to identification as an object portion or a boundary portion. Division of boundary portions may be performed only one time or two or more times. Needless to say, if the number of times that boundary blocks are divided is increased, the accuracy of contour setting is improved but the processing load is increased.

Figure 8:
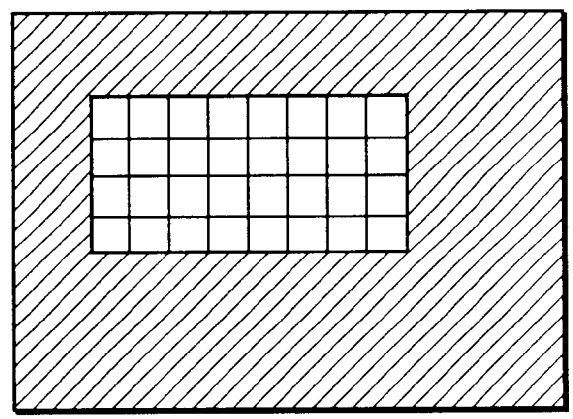
FIG. 8 is a diagram showing blocks corresponding to an object and boundary blocks after first block division.
Figure 9:
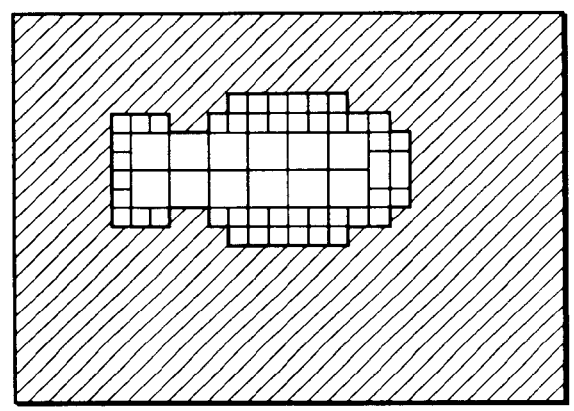
FIG. 9 is a diagram showing object blocks and boundary blocks after redivision and classification of the boundary blocks shown in FIG. 8.

FIG. 8 shows object blocks and boundary blocks with respect to the first block division (The background portion is shown as a solid gray area). FIG. 9 shows object blocks and boundary blocks after the boundary blocks in the example of shown in FIG. 8 have been divided and classified (The background portion is shown as a solid gray area).

Figure 10:
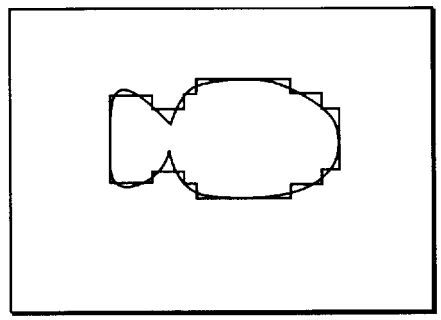
FIG. 10 is a diagram schematically showing an intermediate state in processing for automatic initial contour setting.

After the completion of the block classification (S13), a contour line (initial contour) is set between the object blocks, the boundary blocks and the background blocks (S14). FIG. 10 shows a set initial contour and the contour of the object in a superposed state. It is not always necessary to set an initial contour just bordering on the background blocks. An initial contour may be formed by connecting centers of the boundary blocks or the middle points on boundary lines by straight lines or spline curves.

To converge the set initial contour to the actual contour of the object, an active contour model called "Snakes" is used. Generally, "Snakes" are contour extraction models in which a contour (closed curve) expressed on the image plane (x, y) by a parameter:

$$v(s)=(x(s), y(s))$$

where $0 \leq s \leq 1$ is modified so that an energy function defined by equation (1) shown below is minimized, and thereby a shape of the contour is determined as a minimal energy state.

$$Esnake(v(s)) = \int_0^1 (Eint(v(s)) + Eimage(v(s)) + Econ(v(s)))ds \quad (1)$$

$$Espline(v(s)) = \frac{1}{2}\{\alpha \cdot (v'(s))^2 + \beta \cdot (v''(s))^2\} \quad (2)$$

$$Eedge(v(s)) = -\frac{1}{2}\gamma|\nabla I(v(s))|^2 \quad (3)$$

In equation (1), Eint is internal energy, Eimage is image energy, and Econ is external energy. Econ is used for forced exertion of an external force on the snakes. External energy may be used as occasion demands.

As Eint, Espline shown in equation (2) representing the smoothness of a contour is used in many cases. In equation (2), v'(s) and V"(s) are first-order differential and second-order differential, respectively, of v(s), and α and β are weight coefficients. Each of α and β is ordinarily a function of s but it is assumed to be a constant in this description. Through minimization of Espline, the snakes receives a force which causes the snakes to shrink smoothly.

As Eimage, Eedge defined by using image luminance I (v(s)) in equation (3) is ordinarily used. Eedge represents the luminance gradient. As Eedge is minimized, the snakes receives a force by which the snakes is attracted to an edge. In equation (3), γ is a weight coefficient with respect to image energy, and is a symbol denoting first-order differential.

As a result of the above-described processing, mask data about the initial contour setting frame is obtained.

Figure 11:
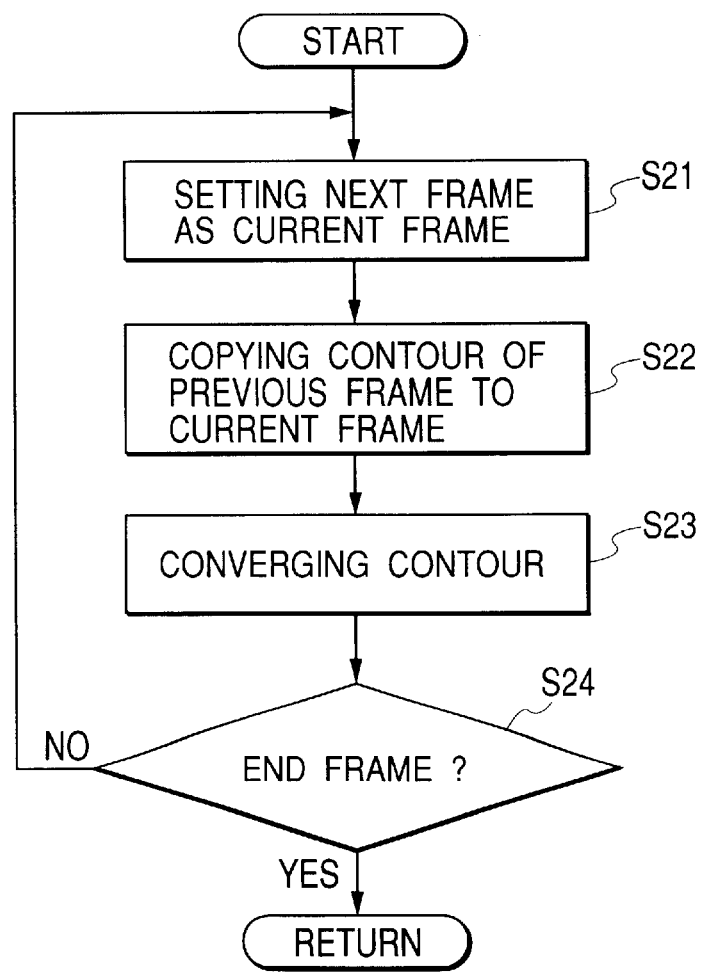
FIG. 11 is a flowchart showing details of tracking from an initial contour setting frame to an end frame (S6)

FIG. 11 is a flowchart showing details of tracking from the initial contour setting frame to the end frame (S6 in FIG. 3).

The frame subsequent to the initial contour setting frame with respect to time is set as the current frame (S21). The contour in the frame preceding the current frame with respect to time is copied to the current frame (S22). This copied frame is set as an initial contour and is converged to the boundary of the object (S23), as is that in step S3 of FIG. 3. After convergence of the contour, a judgement is made as to whether the current frame is the end frame (S24). If the current frame is not the end frame (S24), the next frame with respect to time is set as the current frame (S21) and the subsequent steps (S22, S23) are repeated. If the current frame is the end frame (S24), tracking up to the end frame is completed.

Figure 12:
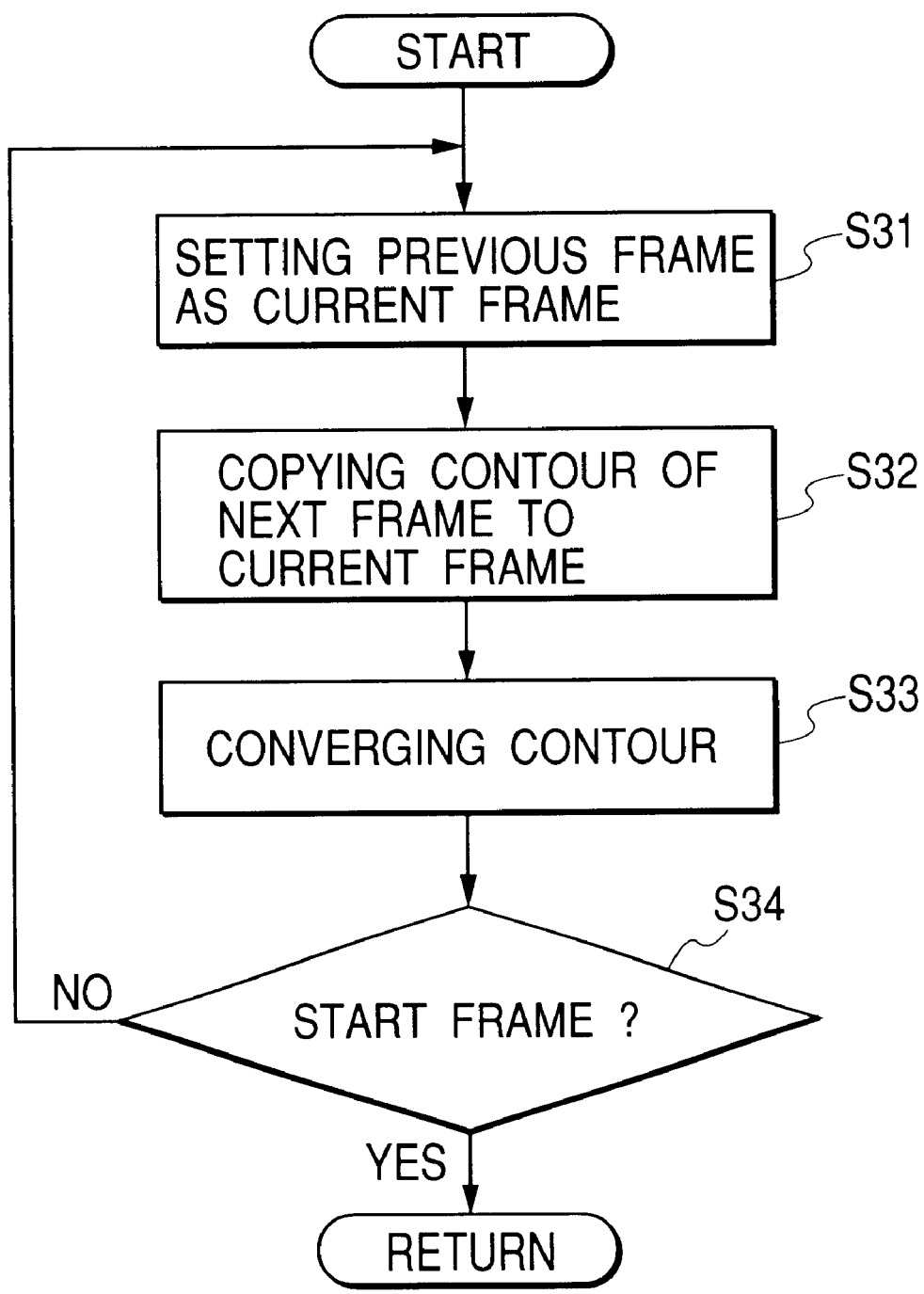
FIG. 12 is a flowchart showing details of tracking from the initial contour setting frame to a start frame (S8)

FIG. 12 is a flowchart showing details of tracking from the initial contour setting frame to the start frame (S8 in FIG. 3).

The frame preceding the initial contour setting frame with respect to time is set as the current frame (S31). The contour in the frame subsequent to the current frame with respect to time is copied to the current frame (S32). This copied frame is set as an initial contour and is converged to the boundary of the object (S33), as is that in step S3 of FIG. 3. After convergence of the contour, a judgement is made as to whether the current frame is the start frame (S34). If the current frame is not the start frame (S34), the previous frame with respect to time is set as the current frame (S31) and the subsequent steps (S32, S33) are repeated. If the current frame is the start frame (S34), tracking to the start frame is completed.

Figure 1:
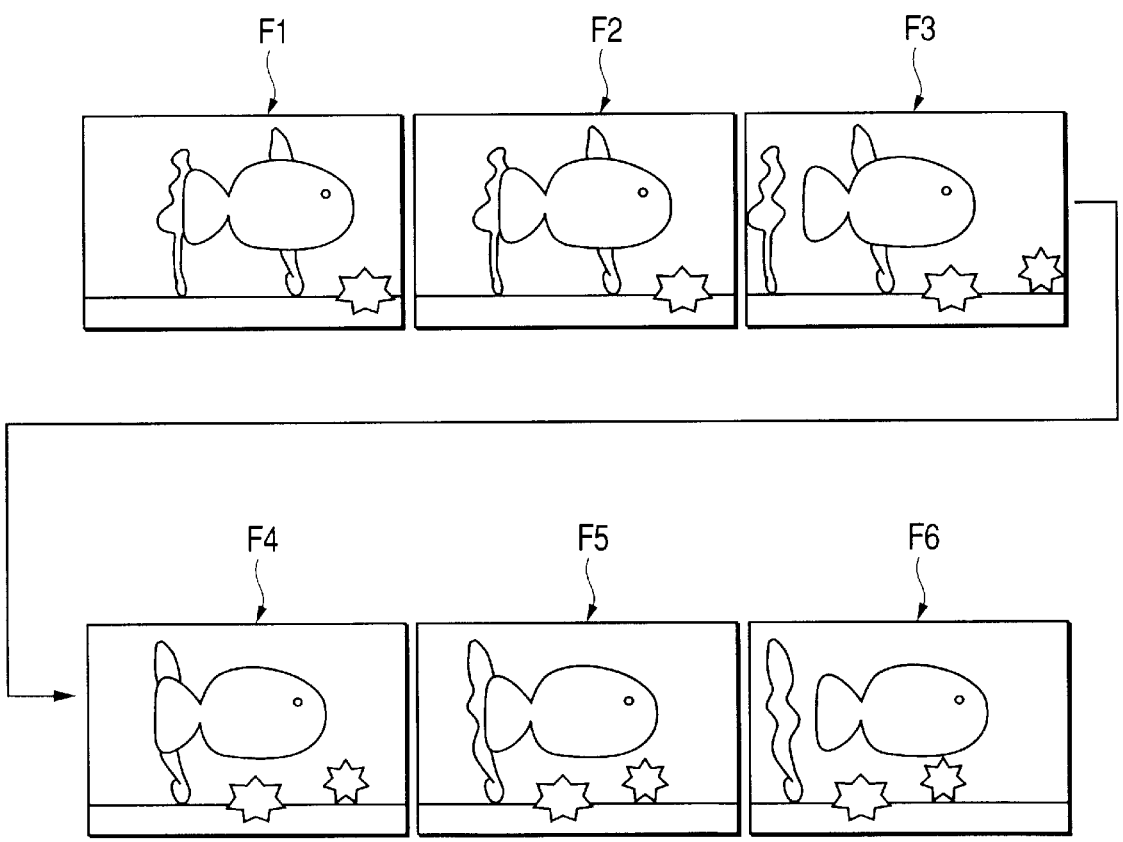
FIG. 1 is a diagram for explaining the movement of an object in frames of a moving picture sequence.
Figure 13:
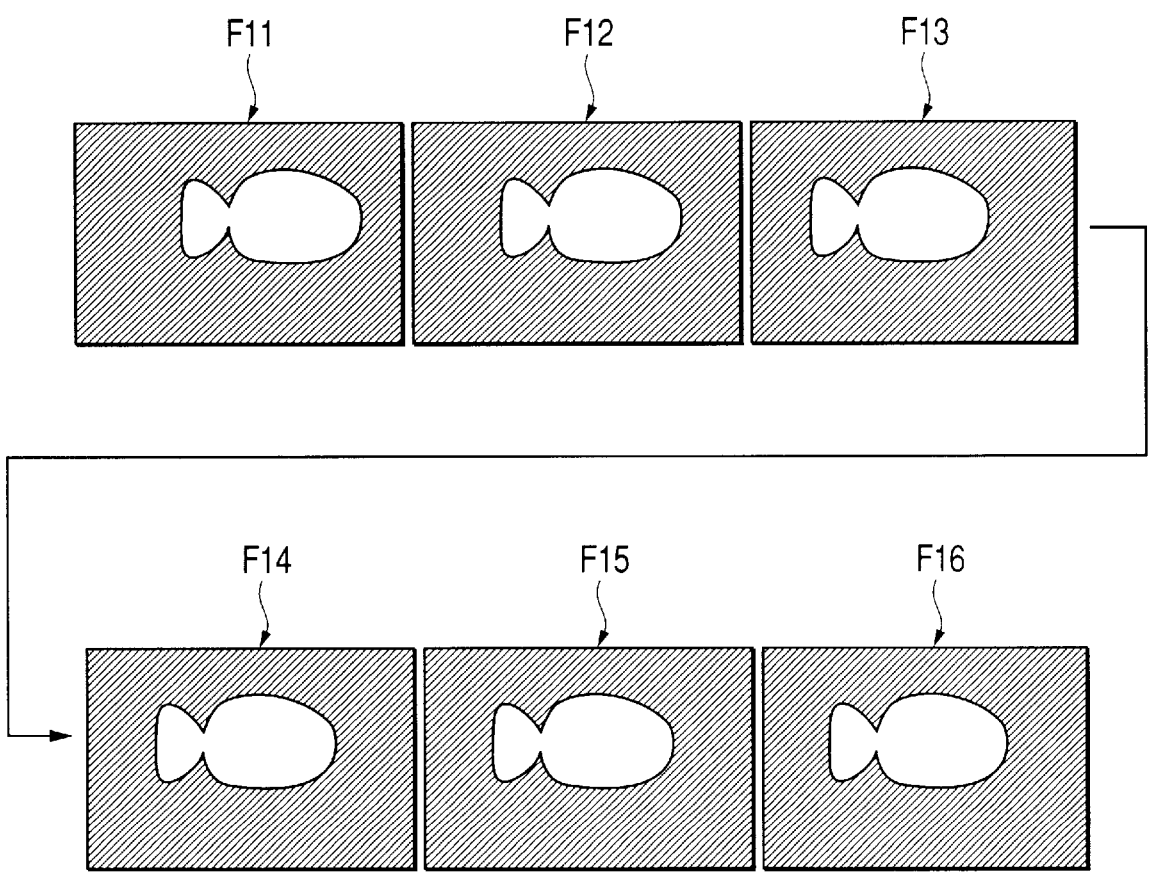
FIG. 13 is a diagram showing an example of mask data obtained from image data such as shown in FIG. 1 by processing in the embodiment shown in FIG. 2.

FIG. 13 shows an example of mask data obtained in this embodiment with respect to image data such as shown in FIG. 1. If frame F13 is an initial contour setting frame, mask data about frames F14 to F16 is obtained by tracking up to the end frame, and mask data about frames F11 and F12 is obtained by tracking up to the start frame.

Figure 14:
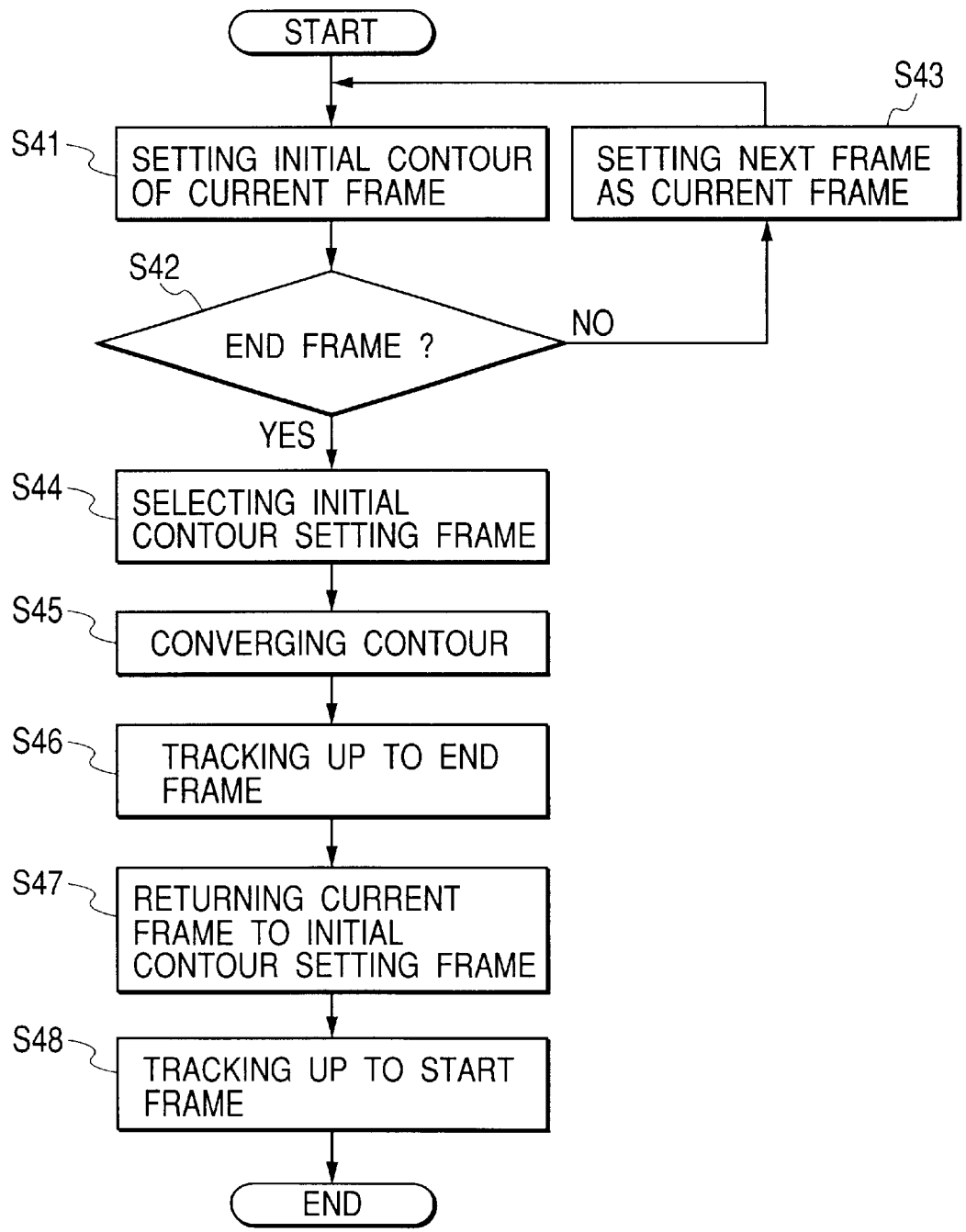
FIG. 14 is a flowchart of another example of the object extraction process.

FIG. 14 is a flowchart of another embodiment of the object extraction process.

In this embodiment, processing is started from the start frame. That is, automatic initial contour setting corresponding to step S2 is executed by setting the start frame as the current frame (S41). Automatic initial contour setting is executed with respect to the frames subsequent to the current frame (S43, S41) until the frame immediately before the end frame is reached (S42).

When execution of automatic initial contour setting up to the frame immediately before the end frame is completed (S42), the results of execution of automatic initial contour setting in the frames are compared and the frame with the initial contour closest to the boundary of the object is selected as an initial contour setting frame (reference frame) (S44). In the selected initial contour setting frame (reference frame), the initial contour is converged to the boundary of the object by the same processing as that in step S3 shown in FIG. 3 (S45).

Tracking from the initial contour setting frame to the end frame is executed (S46), the current frame is returned to the initial contour setting frame (S47), and tracking up to the start frame is executed (S48). It is obvious that tracking up to the start frame may be executed before tracking to the end frame.

Figure 15:
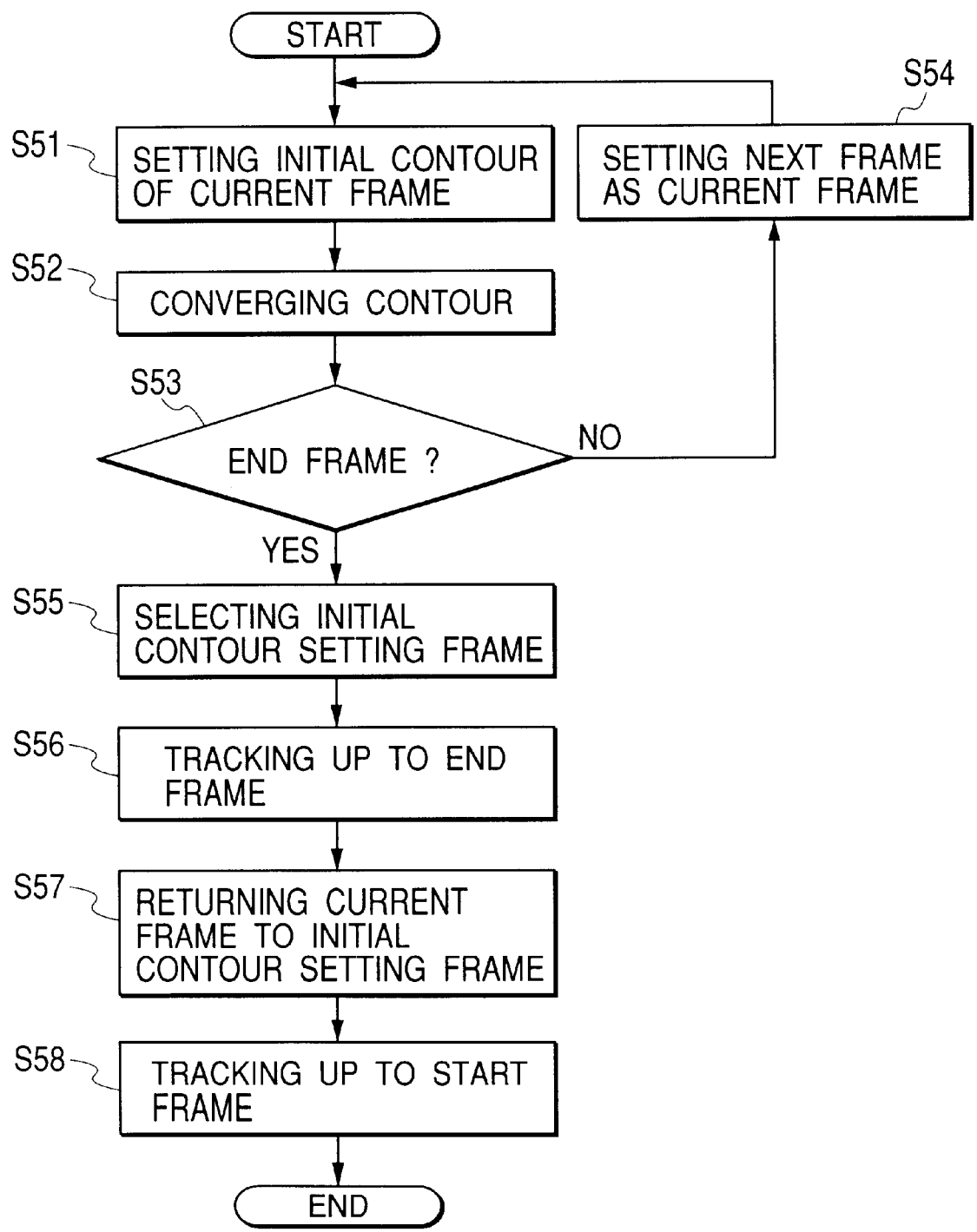
FIG. 15 is a flowchart of another example of the object extraction process.

FIG. 15 is a flowchart of still another embodiment of the object extraction process.

Also in this embodiment, processing is started from the start frame. In the process shown in FIG. 15, an initial contour is first converged to the contour of the object in each frame, one of the frames is determined as an initial contour setting frame (reference frame) by referring to the initial contour convergence results, and tracking up to the end frame and tracking up to the start frame are thereafter executed.

Automatic initial contour setting corresponding to step S2 is executed by setting the start frame as the current frame (S51) and an initial contour is converged to the boundary of the object (S52), as in step S3. Automatic initial contour setting and contour convergence are executed with respect to the frames subsequent to the current frame (S53, S51, S52) until the frame immediately before the end frame is reached (S54).

When execution of automatic initial contour setting and contour convergence up to the frame immediately before the end frame is completed (S54), the results of contour convergence in the frames are compared and the frame with the initial contour best converged to the boundary of the object is selected as an initial contour setting frame (reference frame) (S55). Tracking from the initial contour setting frame to the end frame is executed (S56), the current frame is returned to the initial contour setting frame (S57), and tracking up to the start frame is executed (S58). It is obvious that tracking up to the start frame may be executed before tracking up to the end frame.

Figure 16:
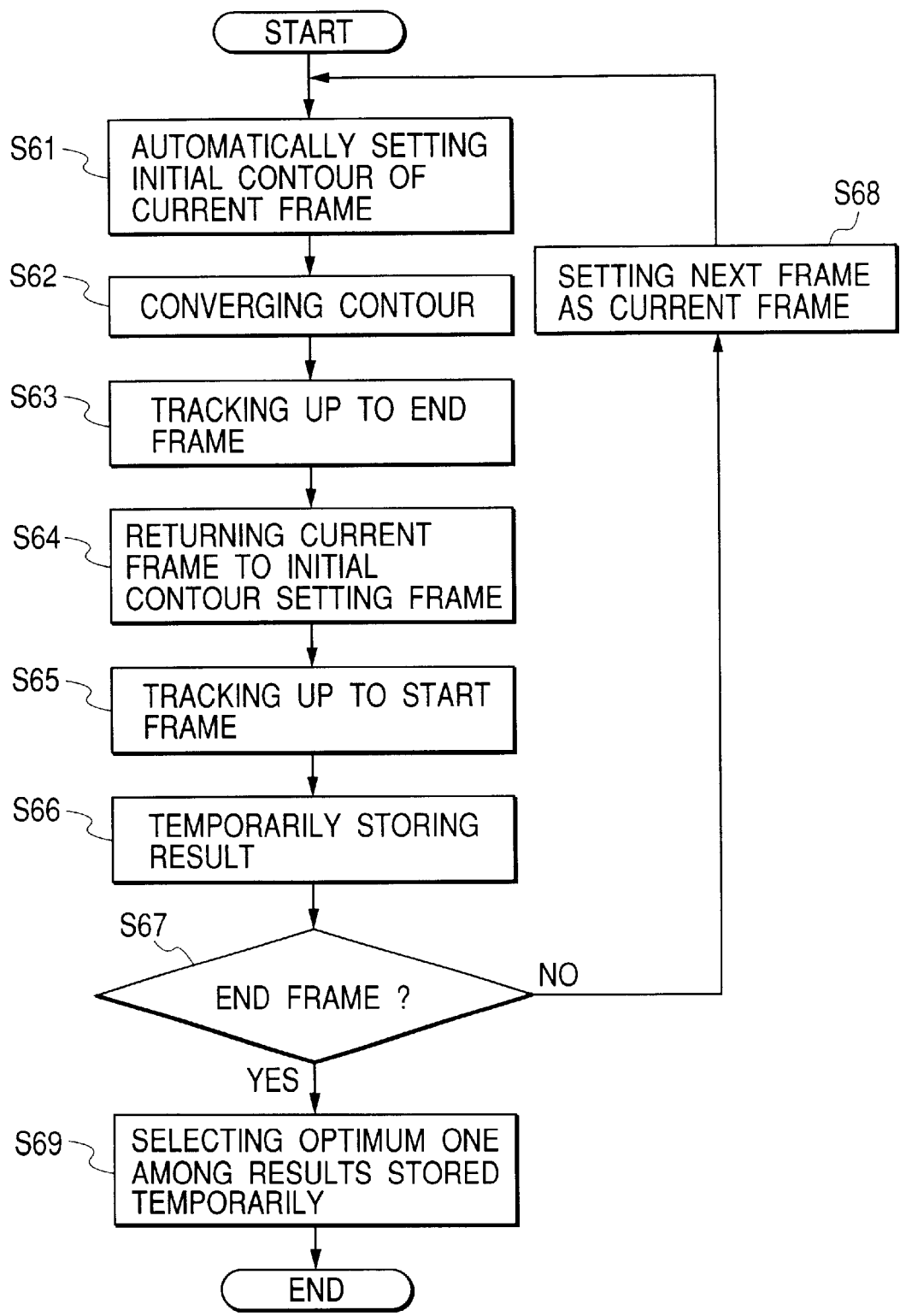
FIG. 16 is a flowchart of another example of the object extraction process.

FIG. 16 is a flowchart of a further embodiment of the object extraction process.

Also in this embodiment, processing is started from the start frame. Automatic initial contour setting corresponding to that shown in FIG. 4 is executed with respect to the current frame (S61) and an initial contour is converged to the contour of the object by the same processing as that in step S3 (S62). Tracking up to the end frame is executed (S63), the current frame is then returned to the initial contour setting frame (S64), and tracking from the initial contour setting frame to the start frame is executed (S65). When the process advances to step S65 first time, step S65 is not actually executed since the initial contour setting frame is the start frame. As a result of processing up to this step, with respect to the initial contour setting frame corresponding to the start frame, the object is extracted from all the frames. The results of object extraction from all the frames are temporarily stored in the memory (S66).

Steps S61 to S66 are repeated with respect to the current frame successively selected from the subsequent frames (S68) until the frame immediately before the end frame is set as an initial contour setting frame. That is, the object boundaries in the frames in the case where automatic initial contour setting is performed with respect to the frames from the start frame to the frame immediately before the end frame are thereby extracted. The number of times that the sequence of steps is repeated is the number of frames−1. In the example shown in FIG. 1, the number of frames is 6 and the number of results of object extraction from all the frames is 5.

The optimum one in the extraction results temporarily stored in the memory is selected as a final extraction result (S69).

Figure 17:
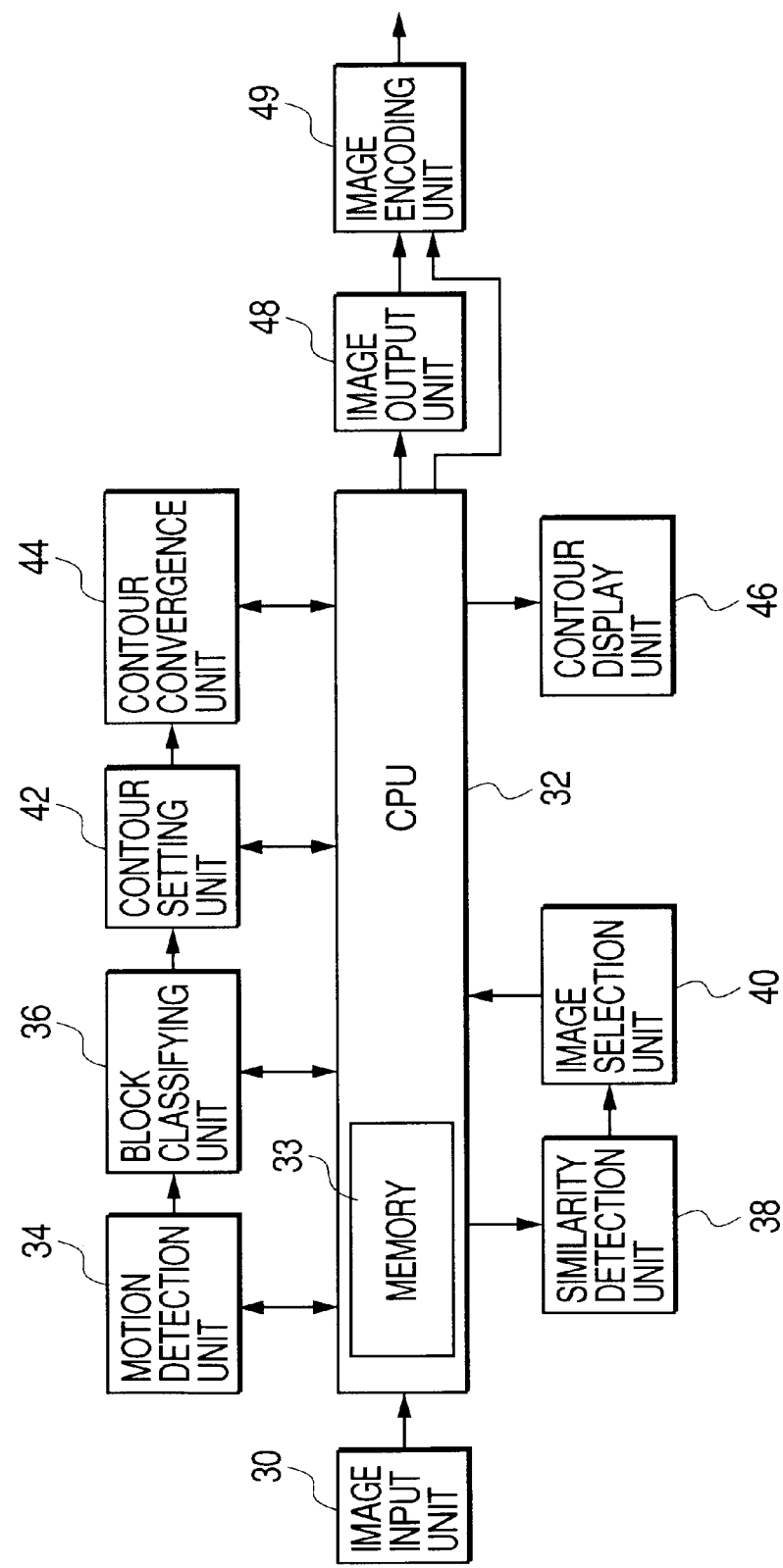
FIG. 17 is a block diagram showing the configuration of an image processing apparatus which represents a second embodiment of the present invention.

FIG. 17 is a block diagram schematically showing the configuration of an image processing apparatus which represents a second embodiment of the present invention.

Referring to FIG. 17, an image input unit 30, which is constituted by a video camera, an image reproducing device, or the like, supplies moving image data to a CPU 32. The CPU 32 controls each unit in the image processing apparatus and has a memory 33 for temporarily storing several frames of moving image data input through the image input unit 30.

A motion detection unit 34 detects amounts of motion of image portions in a currently-processed frame from a plurality of frames of image data stored in the memory 33. A block classifying unit 36 classifies blocks in the currently-processed frame into background portions and portions corresponding to an object according to detection results from the motion detection unit 34.

A similarity detection unit 38 determines similarity of the blocks classified by the block classifying unit 36 between the frames. An image selection unit 40 selects one of the frames having a higher degree of similarity and sets the selected frame as an initial contour setting frame.

A contour setting unit 42 sets an initial contour at the boundaries between background portions and object portions according to classification results from the block classifying unit 36 in the initial contour setting frame selected by the image selection unit 40. A contour convergence unit 44 converges the initial contour set by the contour setting unit 42 into a shape close to the actual contour of the object.

The result of convergence is transferred to a contour setting unit 42 through the CPU 32 to be set as an initial contour in the next frame to be processed. The contour convergence unit 44 converges the initial contour to the actual contour of the object in this frame, as it does with respect to the preceding frame. This processing is executed in each of the two directions, i.e., the direction from the initial contour setting frame to the end frame and the direction from the initial contour setting frame to the start frame. Finally, the contours of the objects in all the frames are determined.

A contour display unit 46 displays the progress and final results. A user can check the progress and final results on the screen of the contour display unit 46. An image output unit 48 outputs the thus-obtained results as contour data or mask data on contents inside and outside the object. An image encoding unit 49 encodes data on an object basis according to the output from the image output unit and moving image data read out from the memory 33. The image encoding unit 49 executes encoding in accordance with the Moving Picture Experts Group Phase 4 (MPEG-4) coding system.

Figure 18:
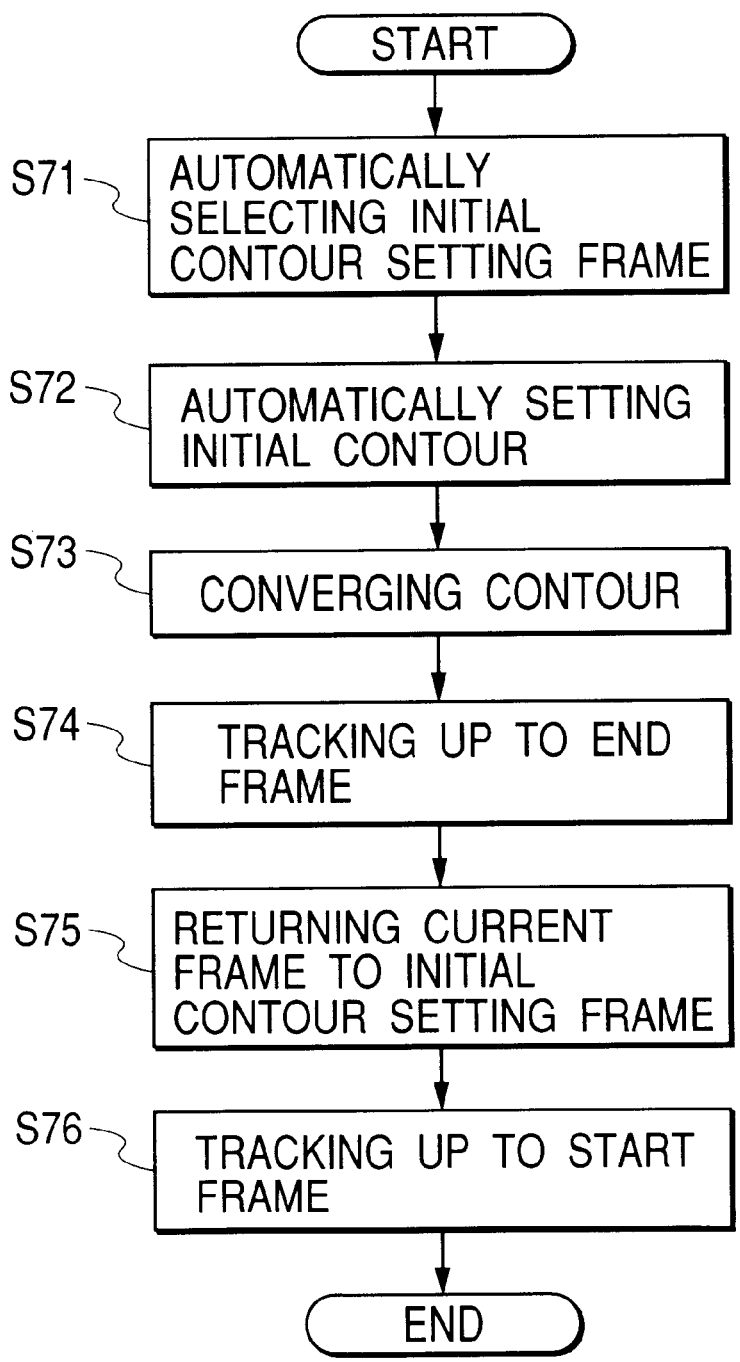
FIG. 18 is a flowchart of an object extraction process in the second embodiment of the present invention.

FIG. 18 is a flowchart of an object extraction process in the second embodiment of the present invention.

From all frames, one for setting an initial contour is automatically selected (S71). An initial contour corresponding to an object is set by automatic processing with respect to the selected frame (S72) and is converged to the actual contour (S73). To converge the contour, an active contour model is used. When convergence of the contour is completed and when the contour coincides with the shape of the object, intra-frame processing is completed and the procedure then advances to inter-frame processing.

The initial contour setting frame is set as a reference frame and tracking up to the end frame is executed (S74). Thereafter, the current frame is returned to the reference frame (S75) and tracking up to the start frame is executed (S76). The object is thus extracted from all the frames from the start frame to the end frame. Needless to say, the same extraction result is also obtained when tracking from the reference frame to the end frame is executed after execution of tracking from the reference frame to the start frame.

Figure 19:
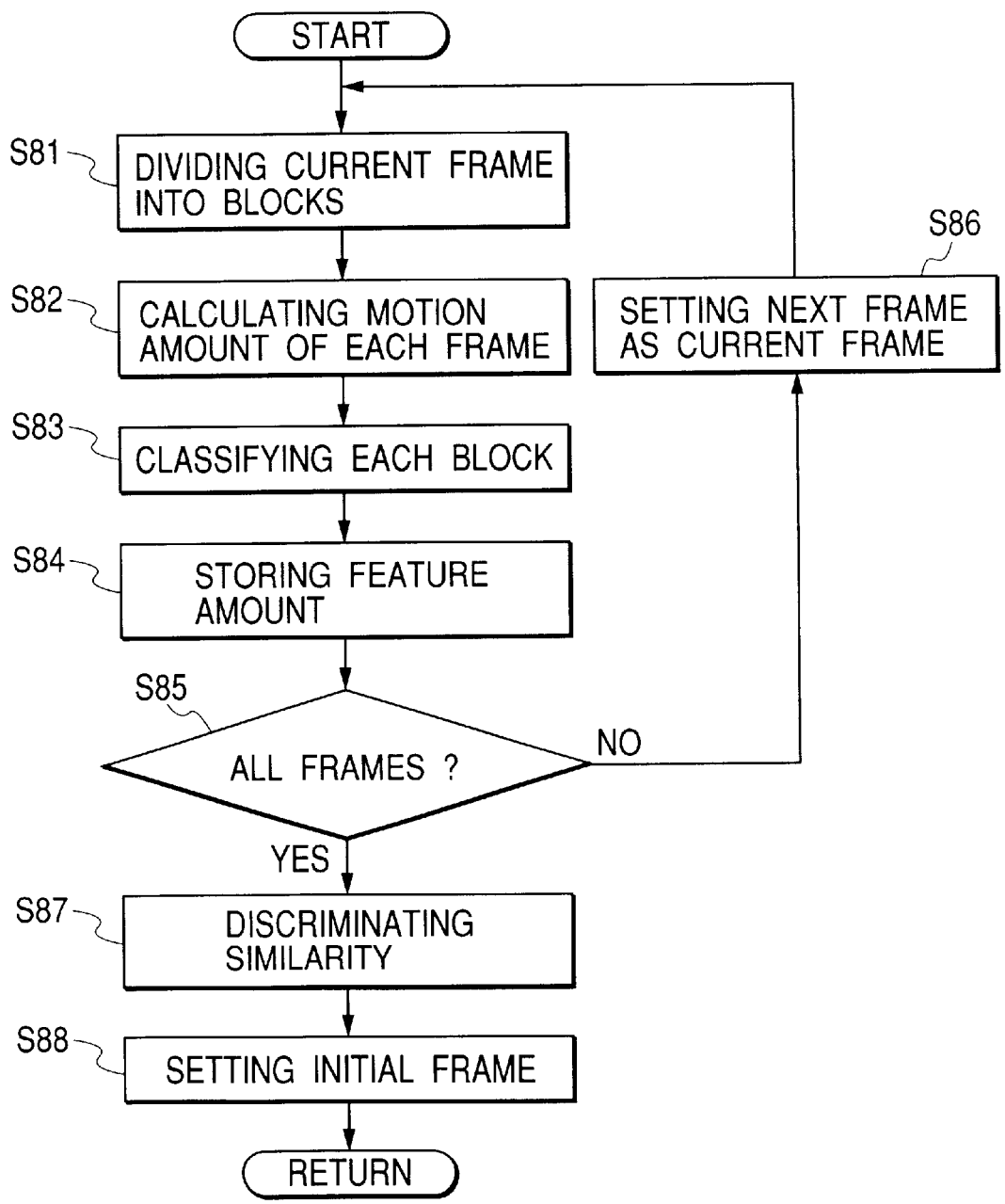
FIG. 19 is a flowchart showing details of automatic selection of an initial contour setting frame (S71) shown in FIG. 18.

FIG. 19 is a flowchart showing details of automatic selection (S71 in FIG. 18) of an initial contour setting frame.

Processing is started with the start frame set as the current frame. First, the current frame is divided into blocks (S81), and the amount of motion of each block is calculated (S82). The calculation of the amount of motion is a process in which the position in the next frame to which each block of the processed frame corresponds is identified by a method generally known as block pattern matching, and the shift of each block from the corresponding position in the frame is obtained as a motion vector. A function for evaluating a match in pattern matching is, for example, addition of the squares of the differences between the blocks or addition of the absolute values of the differences.

After motion vectors have been obtained with respect to all the blocks, the blocks are classified according to the values of the motion vectors (S83). A feature amount of this frame is obtained from the results of classification and stored (S84). The method for classification and the method for calculating the feature amount will be described below in detail.

After a feature amount of the first frame has been obtained, the above-described processing (S81 to S84) is performed on the second frame, the third frame, and so on (S86), thereby processing all the frames (S85).

After the completion of the processing of all the frames (S85), high similarity in feature amount is discriminated from the frames (S87) and one of the frames having the highest degree of similarity is selected and set as an initial contour setting frame (S88).

Automatic initial contour setting (S72) and contour convergence (S72) shown in FIG. 18 will now be described in detail.

The simplest method of automatically setting an initial contour is the method of setting an initial contour at the boundary of blocks classified as object blocks. In this method, the accuracy of the initial contour depends on the size of the blocks. For convergence from the set initial contour to the actual object contour, an active contour model called "Snakes" is used as described above with respect to the first embodiment.

Figure 20:
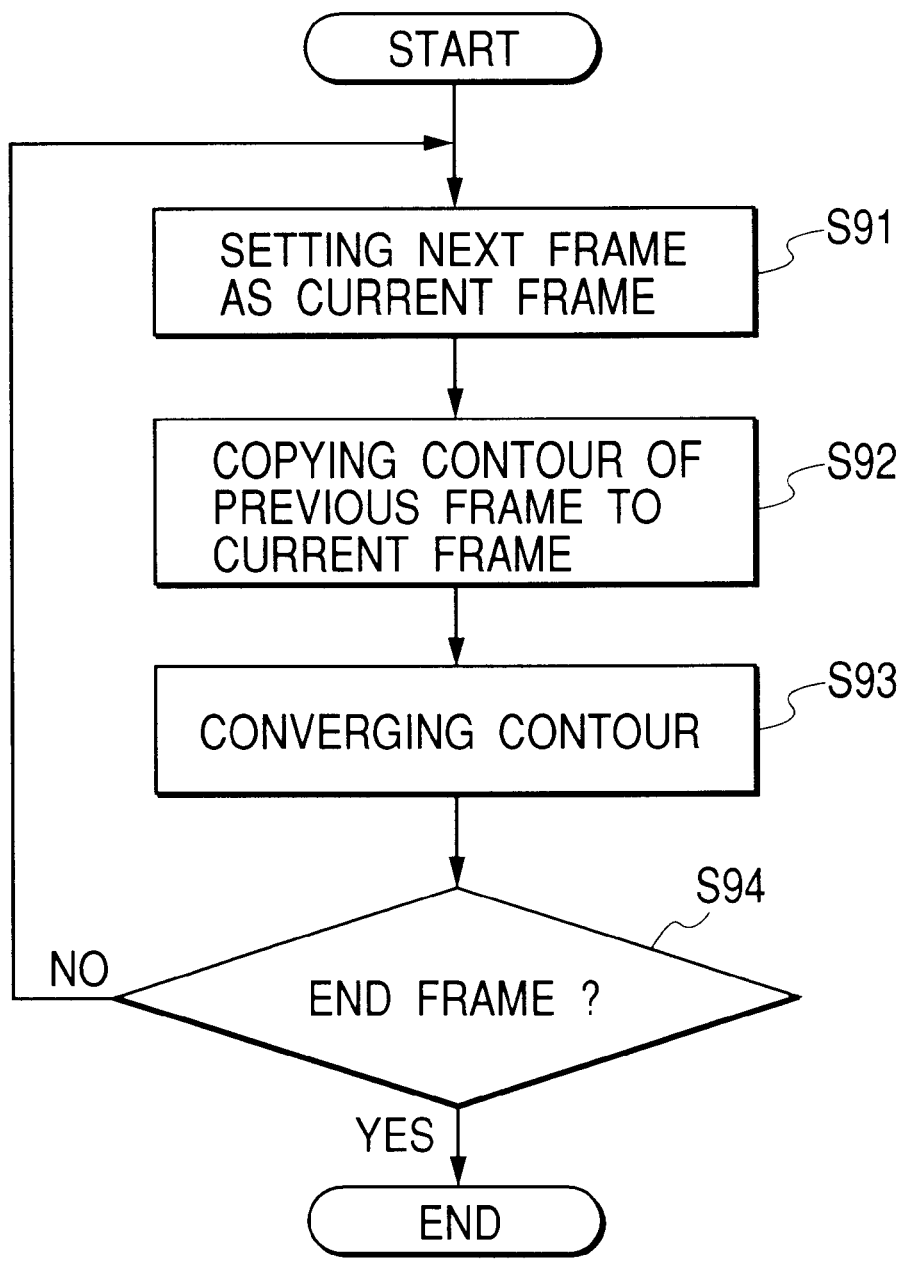
FIG. 20 is a flowchart showing details of tracking from the initial contour setting frame to an end frame (S74)

FIG. 20 is a flowchart showing details of tracking from the initial contour setting frame to the end frame (S74).

The frame subsequent to the initial contour setting frame with respect to time is set as the current frame (S91). The contour in the frame preceding the current frame with respect to time is copied to the current frame (S92). This copied frame is set as an initial contour and is converged to the boundary of the object (S93), as is that in step S3 or S73. After convergence of the contour, a judgement is made as to whether the current frame is the end frame (S94). If the current frame is not the end frame (S94), the next frame with respect to time is set as the current frame (S91) and the subsequent steps (S92, S93) are repeated. If the current frame is the end frame (S94), tracking up to the end frame is completed.

Figure 21:
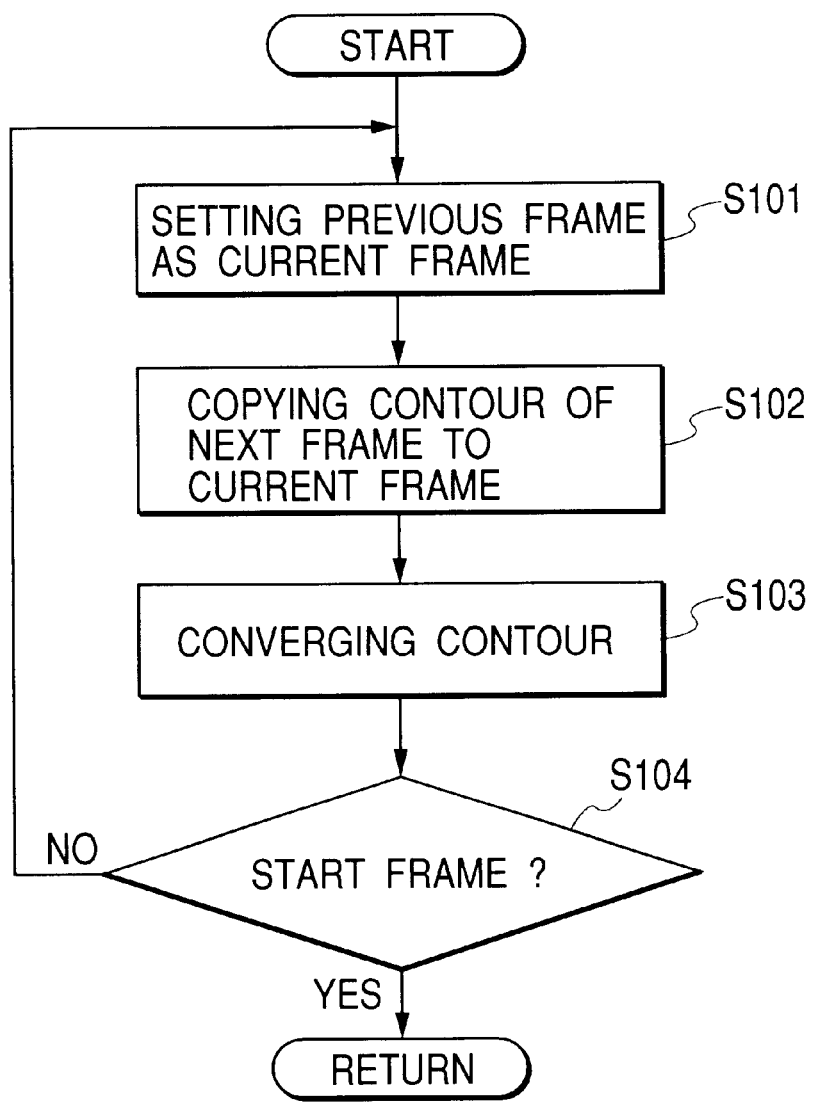
FIG. 21 is a flowchart showing details of tracking from the initial contour setting frame to a start frame (S76)

FIG. 21 is a flowchart showing details of tracking from the initial contour setting frame to the start frame (S76).

The frame preceding the initial contour setting frame with respect to time is set as the current frame (S101). The contour in the frame subsequent to the current frame with respect to time is copied to the current frame (S102). This copied frame is set as an initial contour and is converged to the boundary of the object (S103), as is that in step S3 or S73. After convergence of the contour, a judgement is made as to whether the current frame is the start frame (S104). If the current frame is not the start frame (S104), the previous frame with respect to time is set as the current frame (S101) and the subsequent steps (S102, S103) are repeated. If the current frame is the start frame (S104), tracking up to the start frame is completed.

A feature amount of each frame will next be described.

A feature amount may be, for example, one relating to a histogram of motion vectors or a histogram of block classification results. The processing procedure will be described with reference to a moving picture sequence shown in FIG. 22 and a flowchart shown in FIG. 23.

Figure 22:
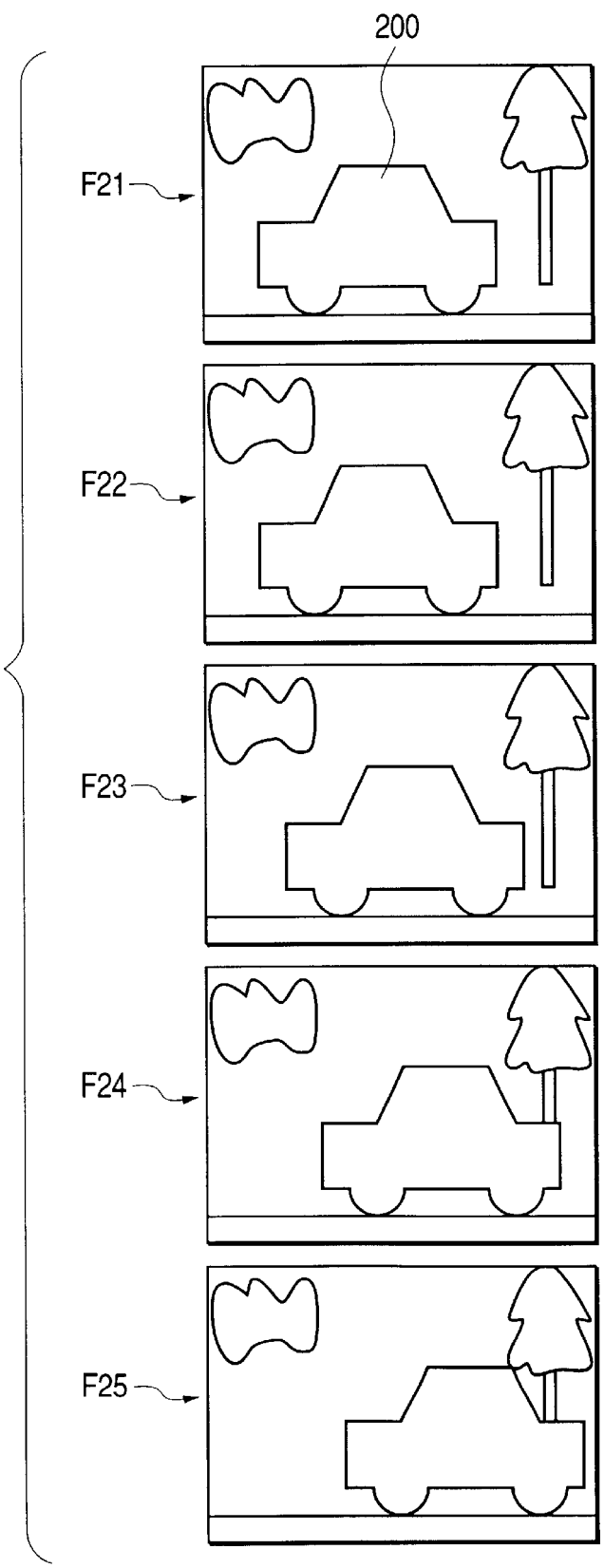
FIG. 22 is a diagram showing an example of a moving picture sequence.

Referring to FIG. 22, five frames F21 to F25 are provided as an object of processing. Frame 21 is a start frame and frame 25 is an end frame.

Figure 24:
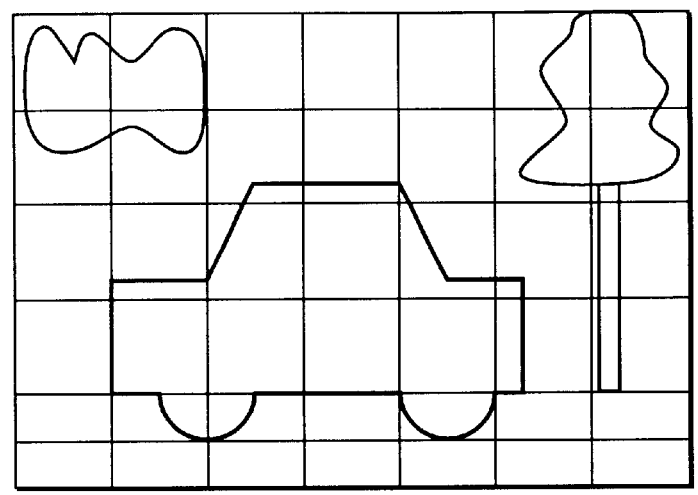
FIG. 24 is a diagram showing an example of block division.
Figure 25:
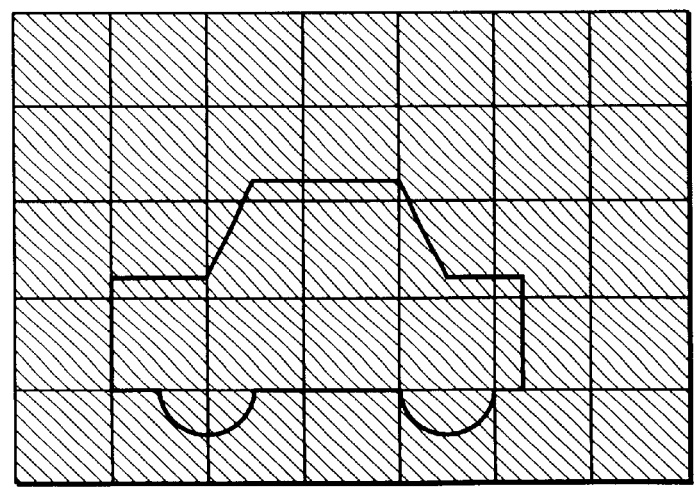
FIG. 25 is a diagram showing the distribution of an amount of motion detected from the divided blocks shown in FIG. 24.

The frame F21 is divided into blocks as shown in FIG. 24 (S111). In the example of division shown in FIG. 24, one frame is divided into 7×5 blocks. The amounts of motion of these blocks are obtained (S112). If frame F22 is a reference frame, there is no relative movement between frame F22 and frame F21, so that completely uniform motion vectors, i.e., vectors of the zero motion amount, are detected. FIG. 25 is a diagram showing the distribution of the motion amounts obtained. Hatched blocks represent blocks of the zero motion amount.

Next, the motion vectors are classified (S113). Since in frame F21 the amounts of motion of all the blocks are zero, it is determined that no object blocks have been detected and all the blocks are identified as background blocks. The number of object blocks (zero in this case) is stored as a feature amount of this frame (storing a histogram) (S114). In the example of frames shown in FIG. 22, a motor vehicle 200 is recognized as an object.

Steps S113 and S114 will be described in more detail.

Figure 23:
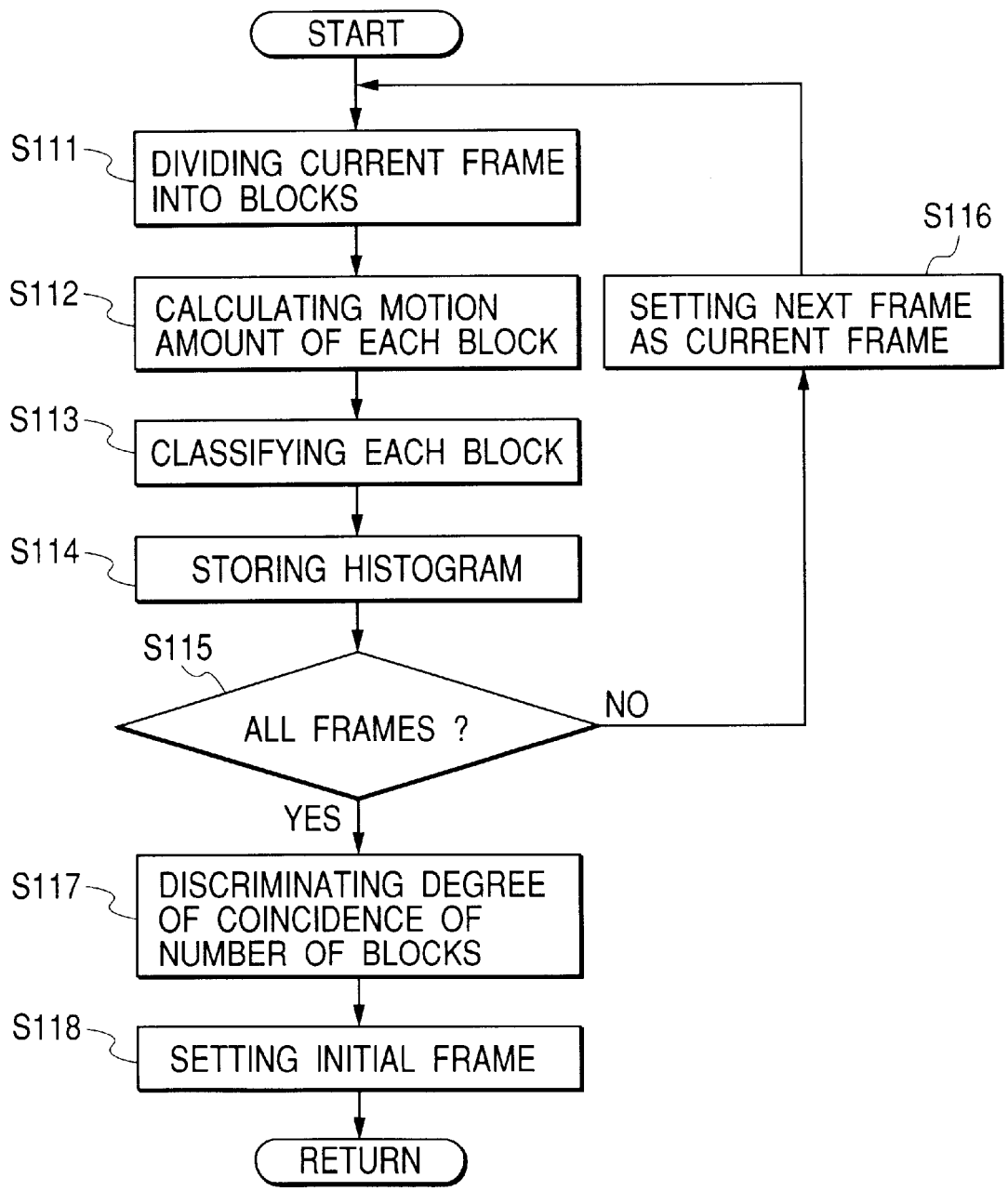
FIG. 23 is a flowchart showing details of automatic selection of an initial contour setting frame (S71) shown in FIG. 18.
Figure 26:
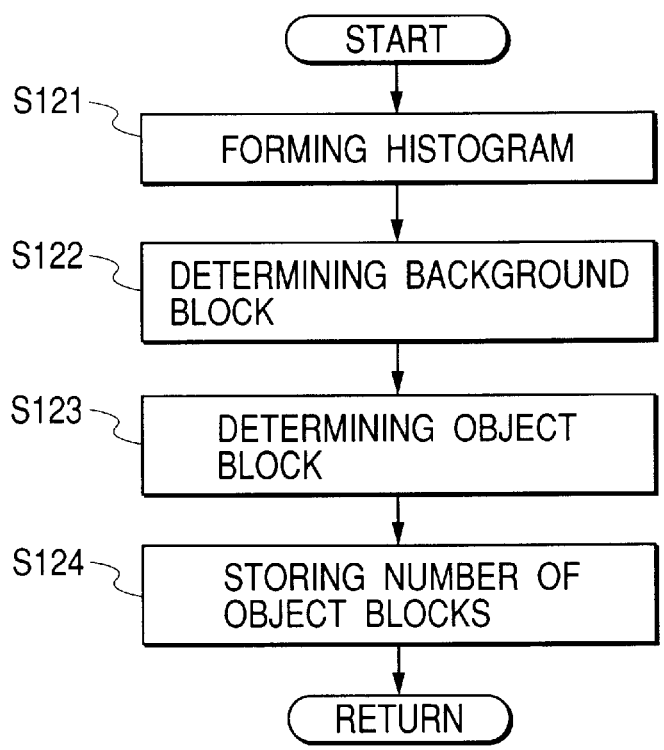
FIG. 26 is a flowchart showing details of steps S113 and S114 in FIG. 23.

FIG. 26 is a flowchart showing details of processing in steps S113 and S114 shown in FIG. 23.

The motion vectors are classified with respect to the frequency of occurrence (forming a histogram) (S121).

Blocks corresponding to the background are determined (S122), and blocks corresponding to the object are determined (S123). For example, the classified group having the largest number of blocks in the classification is recognized as the background blocks while the classified group having the second largest number of blocks is recognized as the object. Alternatively, the background and the object may be determined according to the positions of the blocks or the dispersion of the blocks. The same number count results can be obtained by subtracting the number of one kind of blocks from the number of the other kind of blocks if the blocks are classified into only two kinds of blocks: background blocks and object blocks. The number of object blocks is stored as a feature amount of the frame (S124).

Referring again to FIG. 23, the next frame F21 is set as the current frame (S116) and is divided into blocks (S111), the amounts of motion of the blocks are calculated (S112), and the blocks are classified (S113).

Since frame F22 is the same as frame F21, the state of divided blocks is the same as those shown in FIG. 24. However, the reference frame referred to when motion vectors are obtained is frame F23, so that there is a relative movement. That is, zero-motion vectors are detected in background portions while a match occurs in object portions with a shift toward the right-hand side of the frame. If a portion of the object and a portion of the background are contained in a block, no corresponding block exists in the reference frame.

Figure 27:
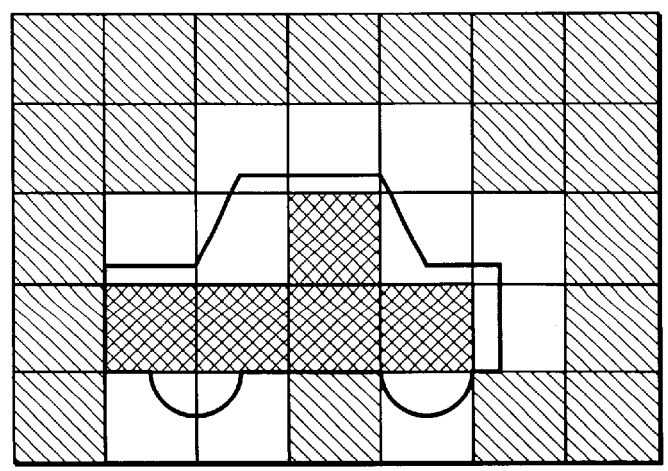
FIG. 27 is a diagram showing an example of classification of blocks into background blocks, object blocks and boundary blocks.

If a threshold value is set in the matching evaluation function to remove blocks of lower degrees of matching, background blocks, object blocks and boundary blocks containing both background and object portions are obtained, as shown in FIG. 27. In FIG. 27, hatched blocks represent background blocks, non-hatched, non-crosshatched blocks represent boundary blocks, and crosshatched blocks represent object blocks. In this case, the number of background blocks is 19, the number of object blocks is 5, and the number of boundary blocks is 11.

Figure 28:
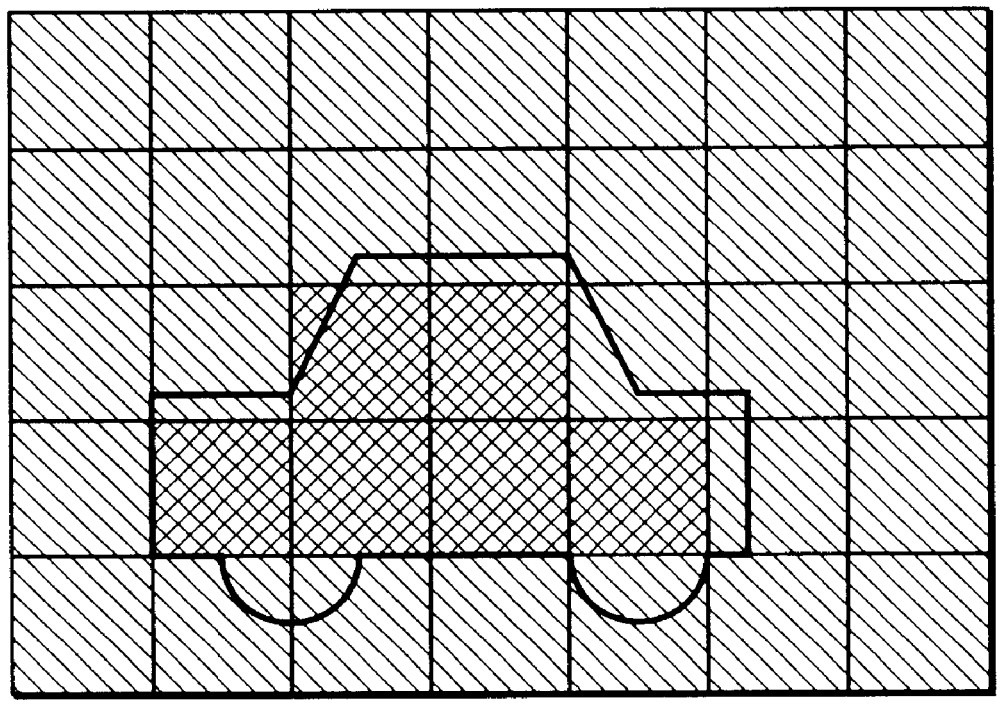
FIG. 28 is a diagram showing an example of classification of blocks into background blocks and object blocks.

If no restriction is imposed on matching evaluation, the number of kinds of motion is limited to two. FIG. 28 shows classification results in such a case. Hatched blocks represent background blocks, and crosshatched blocks represent object blocks. In this case, each of the blocks corresponding to the boundary is classified into the group of background blocks or the group of object blocks. In the example shown in FIG. 28, the number of background blocks is 29, and the number of object blocks is 6.

The number of object blocks 6 is stored as a feature amount of frame F22 (storing a histogram) (S114).

After the numbers of object blocks in frames F21 to F25 have been stored as feature amounts of the frames (storing a histogram) (S115), the degree of matching of the numbers of blocks is discriminated (S117). For example, the numbers of object blocks frames F21 to F25 are compared and some of the frames having the same number of blocks are obtained. In the example shown in FIG. 22, the amount of motion between frames F22 and F23 is large and the amount of motion between frames F23 and F24 is also large, so that the relating numbers of blocks regarded as object blocks are close to each other. Between frames F24 and F25, the amount of motion is small and the block separation accuracy is therefore low, so that the possibility that the number of blocks regarded as object blocks is reduced becomes higher. From these conditions, it is determined that the block separation accuracy of frame F22 is higher. According to this determination result, frame F22 is set as an initial contour setting frame (S118).

Figure 29:
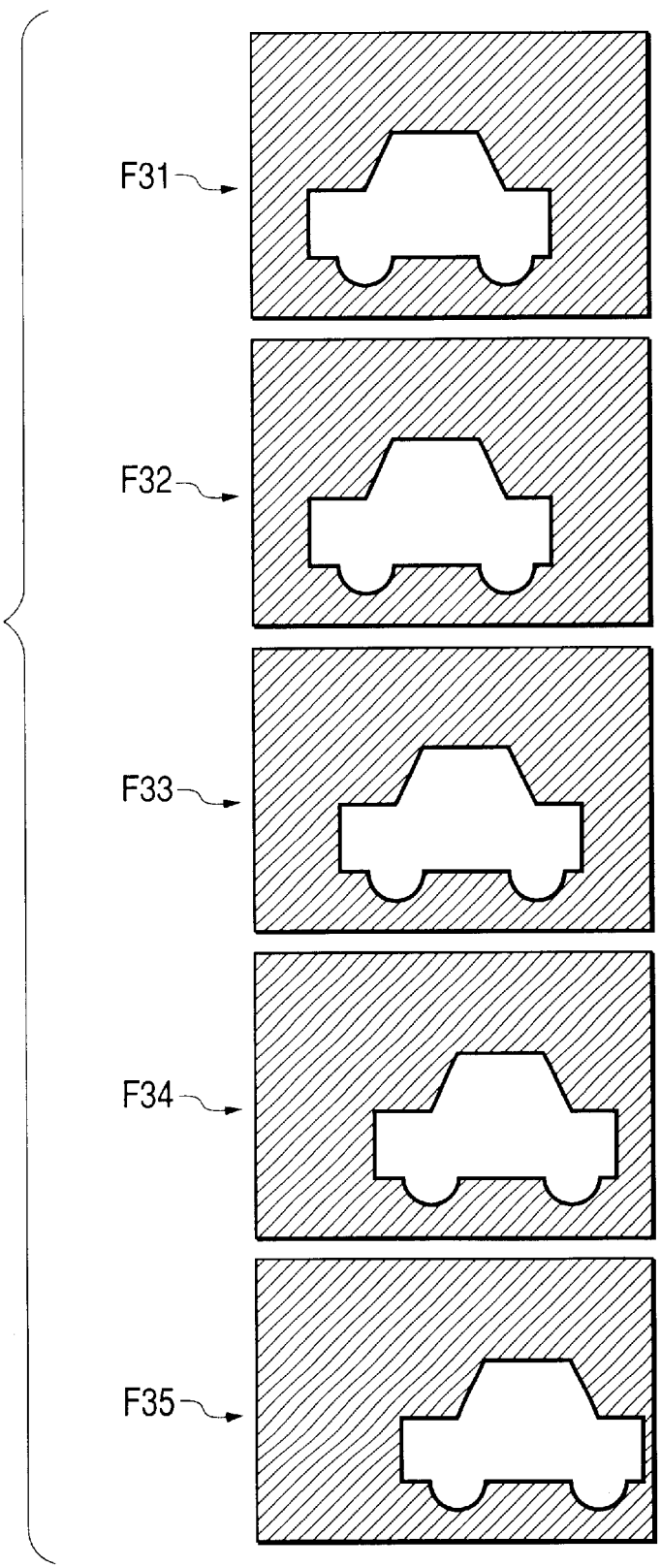
FIG. 29 is a diagram showing an example of mask data.

Subsequently, automatic initial contour setting (S72) and contour convergence (S73) shown in FIG. 18 are performed. When contour convergence is completed, mask data about frame F32 shown in FIG. 29 is obtained from frame F22. By tracking up to the end frame (S74), mask data about frames F33 to F35 is obtained. By tracking up to the start frame (S76), mask data about frame F31 is obtained. Thus, mask data about all the frames is obtained.

While a case where the number of object blocks is stored as a feature amount has been described with respect to the processing shown in FIG. 26, the number of background blocks may be alternatively set as a feature amount. Further, the ratio of the number of background blocks and the object blocks may be computed to be set as a feature amount.

Figure 30:
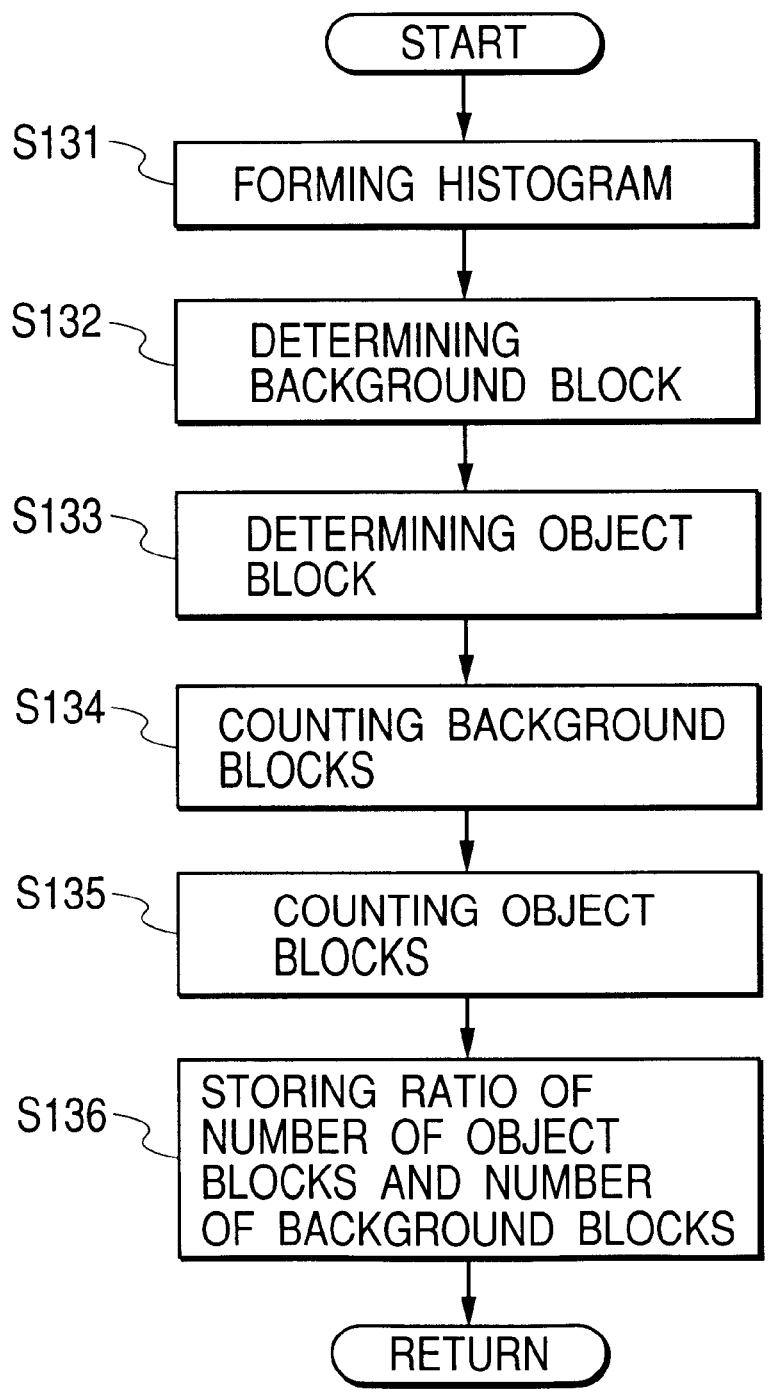
FIG. 30 is a flowchart showing the operation corresponding to steps S113 and S114 in FIG. 23 in a case where the ratio of the number of background blocks and the object blocks is set as a feature amount.

FIG. 30 is a flowchart showing the operation corresponding to step S113 and S114 in a case where the ratio of the number of background blocks and the object blocks is set as a feature amount.

The frequencies of occurrence of motion vectors of the blocks are obtained (forming a histogram) (S131), background blocks are determined (S132), and object blocks are determined (S133). A method may be conveniently used in which blocks having the highest occurrence frequency are recognized as background blocks and blocks having the second highest occurrence frequency are recognized as object blocks. With respect to vectors of third or lower frequencies, similarity to each of the first and second vectors may be computed by vector distance computation, and the corresponding blocks may be classified according to the results of this computation.

The number of background blocks and the number of object blocks are counted (S134, S135) and the ratio of the numbers is stored (S136). Frames having block ratios approximate to each other are considered to have high block separation accuracy.

Figure 31:
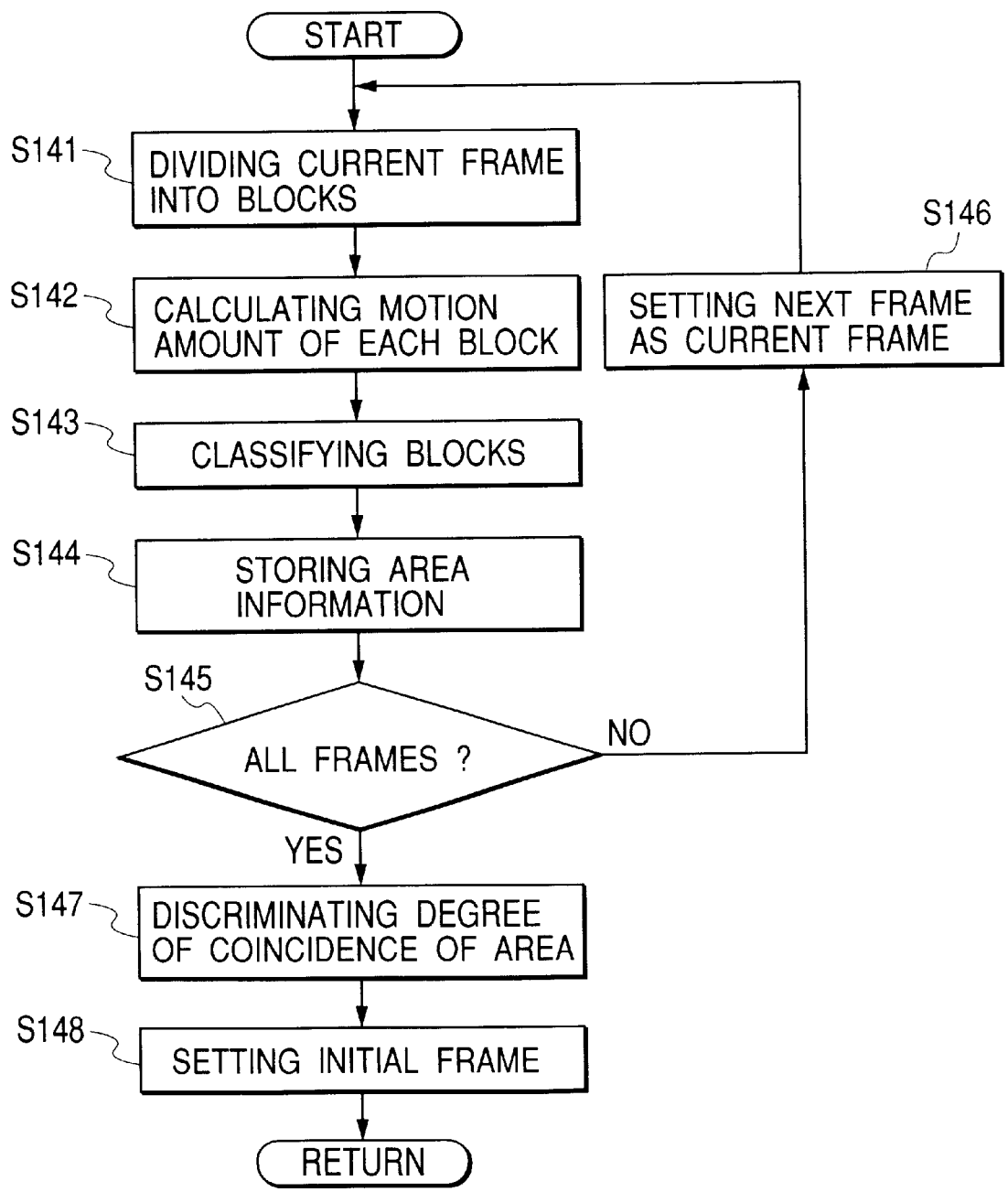
FIG. 31 is a flowchart showing processing for automatically selecting an initial contour setting frame in a case where the area of blocks is set as a feature amount.

FIG. 31 is a flowchart showing processing for automatically selecting an initial contour setting frame in a case where the area of blocks is set as a feature amount.

Information on the area of blocks is stored as a feature amount (S144) and items of area information are compared between the frames to discriminate the degree of matching (S147). In other respects, this processing is basically the same as that shown in FIG. 23, and the description for the corresponding details will not be repeated.

Figure 32:
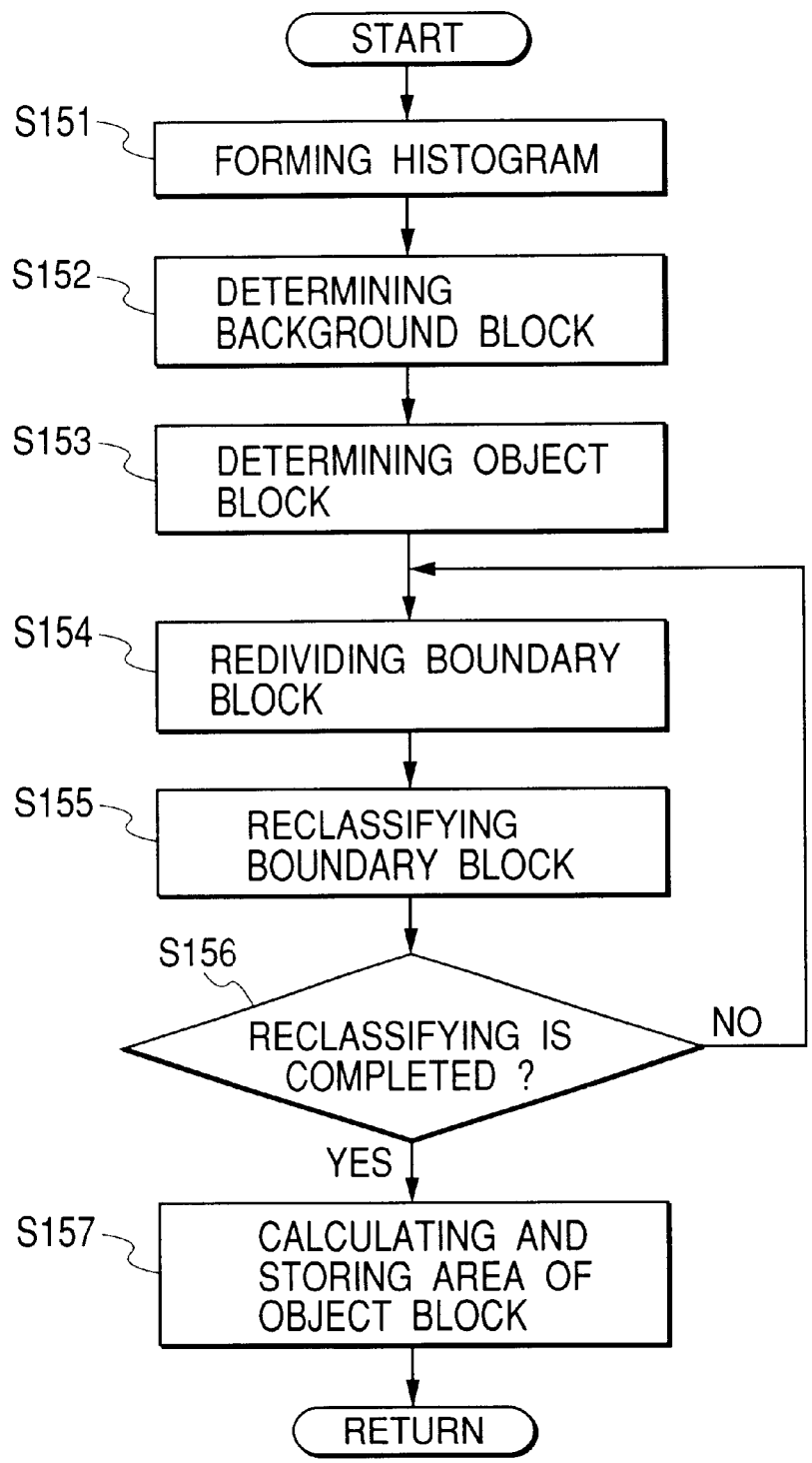
FIG. 32 is a flowchart showing details of step S144 in FIG. 31.

FIG. 32 is a flowchart showing details of step S144 shown in FIG. 31.

Figure 33:
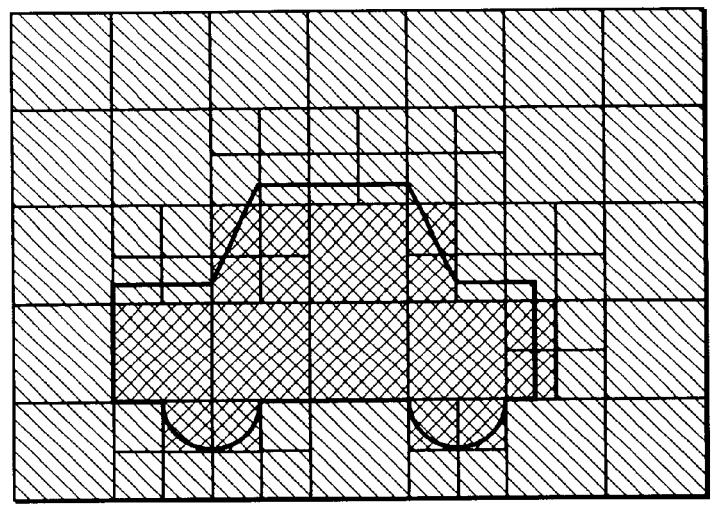
FIG. 33 is a diagram showing the results of block division and reclassification of the boundary blocks shown in FIG. 28.

The frequencies of occurrence of motion vectors of the blocks are obtained (forming a histogram) (S151), background blocks are determined (S152), and object blocks are determined (S153). Redivision of boundary blocks (S154) and classification of redivided blocks (S155) are repeated until classification of the boundary blocks is completed (S156). FIG. 33 shows the results of a process in which each of boundary blocks (represented by non-hatched, non-crosshatched blocks) shown in FIG. 27 is divided into 2×2 blocks which are reclassified into the group of background blocks or the group of object blocks. To perform this reclassification, computation of motion vectors may be again performed or a process may be performed in which the background motion vectors and object motion vectors already obtained are assigned to the blocks and the probability that each block is a background block or a object block is used for evaluation.

Figure 34:
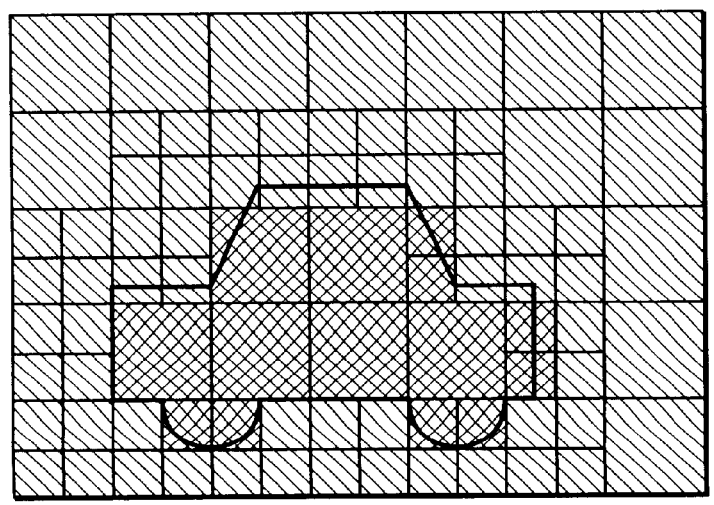
FIG. 34 is a diagram showing the results of redivision of the boundary blocks in block division shown in FIG. 28.

In a case where a classification method in which no boundary block is obtained, as in the example shown in FIG. 28, is used, blocks bordering object blocks and background blocks may be set as boundary blocks. FIG. 34 shows the results of redivision of boundary blocks in the block division shown in FIG. 28.

Figure 35:
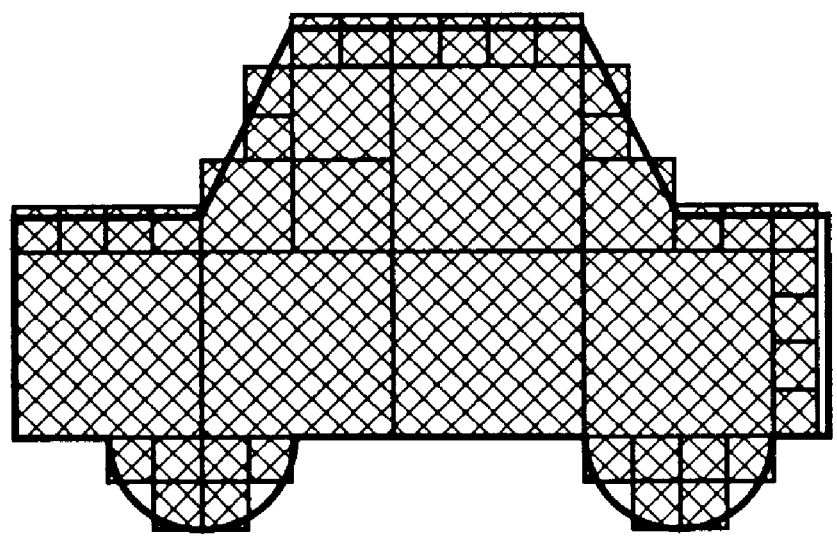
FIG. 35 is a diagram showing the results of two steps of redivision of the boundary blocks.

FIG. 35 shows the results of two steps of redivision. It is obvious that the actual area of the object can be approximated by increasing the number of times that redivision is performed.

Referring again to FIG. 32, after classification of the boundary blocks (S156), the area of the object blocks is calculated and the result of this computation is stored as a feature amount of the frame (S157).

In area matching discrimination (S147), the object areas in the frames are compared to obtain the frames close to each other in the size of object areas obtained. When the amount of relative motion is large, the degree of block separation is high and it is therefore easy to calculate the object area with accuracy. When the amount of relative motion is small, the degree of block separation is low and it is difficult to accurately calculate the object area. Therefore, a substantially large variation in object area results from a frame of a lower degree of separation, and the object areas approximate to each other can be provided from a frame of a higher degree of separation.

In the example shown in FIG. 22, the amount of motion between frames F22 and F23 is large and the amount of motion between frames F23 and F24 is also large, so that the possibility that the object areas in frames F22 and F23 are close to each other is high. For this reason, if it is determined that the block separation accuracy of frame F22 is higher, frame F22 is set as an initial contour setting frame (S148). Subsequently, automatic initial contour setting (S72 shown in FIG. 18) and contour convergence (S73 shown in FIG. 18) are performed.

If block redivison is not performed, the area of the object block is the product of the number of object blocks by the number of pixels in each object block. Since the number of pixels in the object block is constant, the result of this computation is equivalent to that in case of simply counting the number of object blocks described above with respect to the processing shown in FIG. 26.

When an initial frame is set, mask data (frame F32 in this case (see FIG. 29)) about the initial frame (frame F22 in this case (see FIG. 22)) has been obtained. Then, by tracking up to the end frame (S74), mask data about frames F33 to F35 is obtained. By tracking up to the start frame (S76), mask data about frame F31 is obtained. Details of the tracking are as described above. Thus, mask data about all the frames is obtained.

Figure 36:
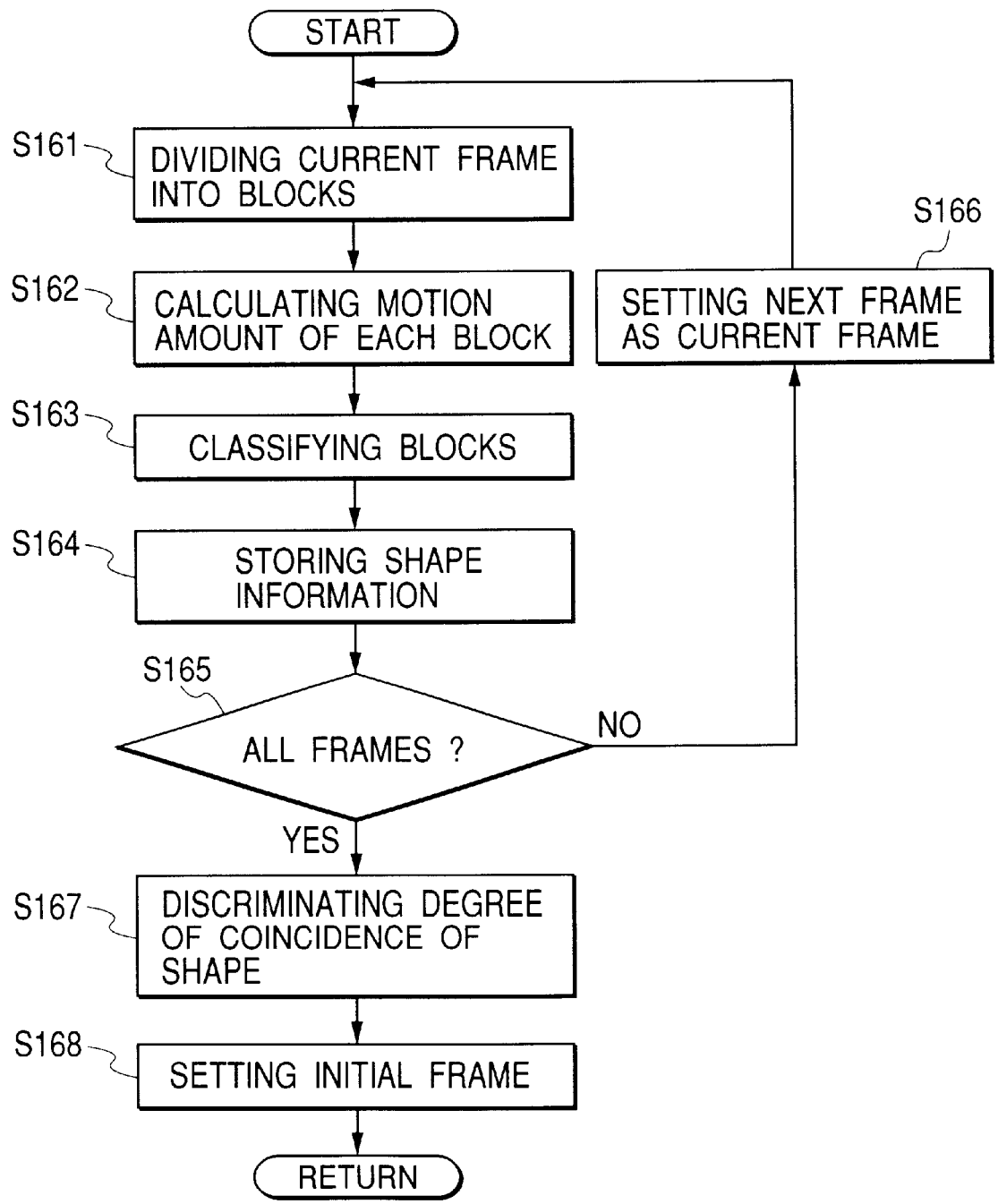
FIG. 36 is a flowchart showing automatic selection of an initial contour setting frame in a case where the shape of an object is set as a feature amount.

FIG. 36 is a flowchart showing processing for automatically selecting an initial contour setting frame in a case where the shape of an area extracted as the object is set as a feature amount.

Information on the shape of the object is stored as a feature amount (S164) and items of shape information are compared between the frames to discriminate the degree of matching (S167). In other respects, this processing is basically the same as that shown in FIG. 23, and a description of the corresponding details will not be repeated.

Figure 37:
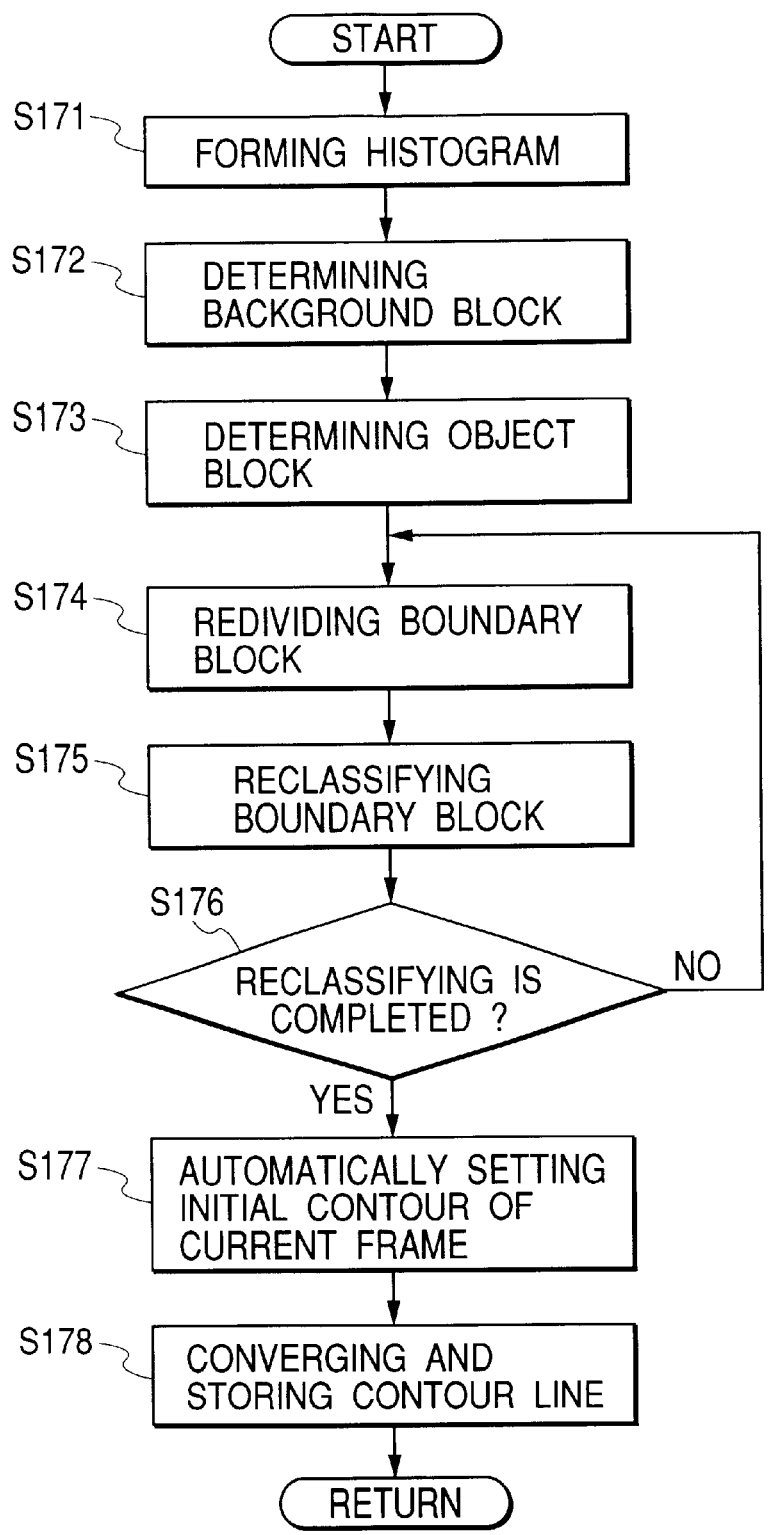
FIG. 37 is a flowchart showing details of step S164 in FIG. 36.

FIG. 37 is a flowchart showing details of step S164 shown in FIG. 36.

The frequencies of generation of motion vectors of the blocks are obtained (forming a histogram) (S171), object blocks are determined (S172), and background blocks are determined (S173). Redivision of boundary blocks (S174) and classification of redivided blocks (S175) are repeated until classification of the boundary blocks is completed (S176).

After the completion of classification of the boundary blocks (S176), an initial contour is automatically set at the boundary between the object blocks and the background blocks (S177) and then is converged to the actual contour of the object (S178). These steps (S177, S178) are respectively the same as steps S72 and S73 shown in FIG. 18.

Figure 38A:
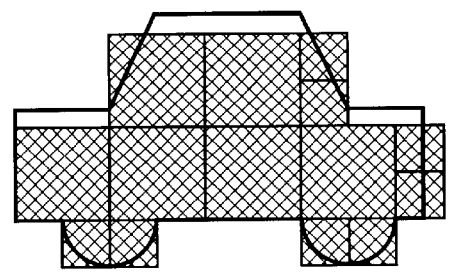
FIGS. 38A, 38B, 38C and 38D are diagrams showing an example of a contour convergence process.
Figure 38B:
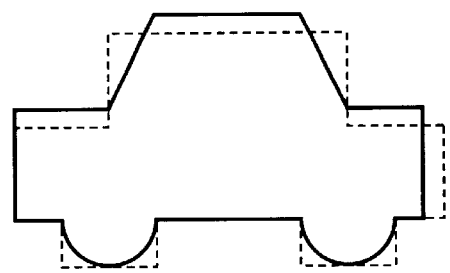
Figure 38C:
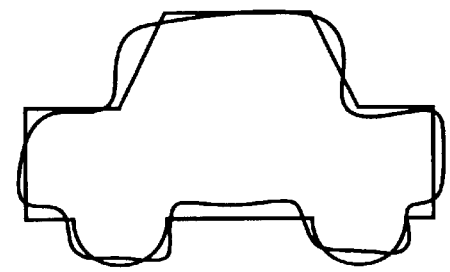
Figure 38D:
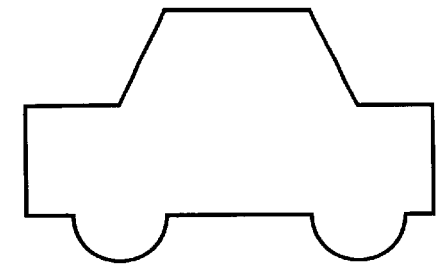

A further description will be made with reference to FIGS. 38A through 38D. FIG. 38A shows blocks about the object shown in FIG. 33. FIG. 38B shows a state in which an initial contour is set at the boundary of the object blocks shown in FIG. 38A. The broken line indicates the initial contour. It is not always necessary that the initial contour be set just at the boundary on the background blocks. Alternatively, an initial contour may be formed by connecting the middle points on boundary lines of the blocks by straight lines or spline curves. FIG. 38C shows a process in which the initial contour is converged to the actual contour of the object. FIG. 38D shows a finally converged state in which the actual contour of the object and the converged contour coincide with each other.

There are several possible methods for storing a feature amount of the contour line. The simplest example is a method of setting the perimeter as a feature amount. For example, the maximum distance between arbitrary two points on the periphery may be obtained or the smallest area of ellipses circumscribed about the contour may be obtained. A complicated example is an expression by a Fourier descriptor, which increases the computation load but can be adapted to a processing for shape coincidence discrimination (S167), even when a zooming sequence is used, because it enables collation non-changing with respect to similar transformation.

After shape information about all the frames have been stored (S165), the degree of matching between the shapes in the frames is discriminated (S167). That is, the values representing the information about the shapes in the frames are compared and some of the frames having the values close to each other are obtained. When the amount of relative motion is large, the degree of block separation is high and it is therefore easy to obtain the shape of the object with accuracy. When the amount of relative motion is small, the degree of block separation is low and it is difficult to accurately compute the shape of the object. Therefore, a substantially large variation in object shape results from a frame of a lower degree of separation, and suitable approximation of the object shape can be achieved from a frame of a higher degree of separation.

In the example shown in FIG. 22, the amount of motion between frames F22 and F23 is large and the amount of motion between frames F23 and F24 is also large, so that the possibility that the object shapes in frames F22 and F23 are close to each other is high. For this reason, if it is determined that the block separation accuracy of frame F22 is higher, frame F22 is set as an initial contour setting frame (S148). Since the contour in this frame has already been obtained, mask data about frame F32 shown in FIG. 29 has already been obtained. Thereafter, by tracking up to the end frame (S74), mask data about frames F33 to F35 is obtained. By tracking up to the start frame (S76), mask data about frame F31 is obtained. Details of the tracking are as described above. Thus, mask data about all the frames is obtained.

The present invention can be realized either by using a plurality of units or by using one unit.

The present invention also comprises a mode of implementation in which a computer (CPU or MPU) in an apparatus or system connected to various devices to operate the same so as to realize the functions of each of the above-described embodiments is supplied with a program code of software for realizing the functions of the embodiment, and is made to operate on the basis of a program stored therein to operate the various devices.

In this case, the program code of the software itself realizes the functions of each of the above-described embodiments, and the program code itself and a means for supplying the program code to the computer, e.g., a storage medium for storing the program code constitute the present invention. The storage medium used to store the above-described program code is, for example, a floppy disk, a hard disk, an optical disc, a magneto-optical disc, a compact disc-read only memory (CD-ROM), a magnetic tape, a nonvolatile memory card, or a ROM.

Needless to say, the above-described program code is included in each of the embodiments of the present invention not only when the program code is executed by the computer to realize the functions of the embodiment but also when the program code realizes the functions of the embodiment in cooperation with an operating system, an application software or the like running on the computer.

Further, needless to say, the present invention covers a case where the supplied program code is stored in a memory provided in a function expansion board inserted into the computer or a function expansion unit connected to the computer, and a CPU or the like provided on the function expansion board or the function expansion unit performs part or the entire of actual processing in accordance with instructions based on the program code, whereby the functions of each of the above-described embodiments are realized.

According to each of the above-described embodiments, as can be readily understood from the foregoing, frames are arbitrarily selected from a moving picture, a contour is automatically extracted therefrom, and automatic tracking to each of preceding and subsequent frames is performed to obtain extraction results with accuracy in a simple manner. It is possible to easily predict convergence and tracking results by selecting a frame as desired from initial contours in a plurality of frames. A frame is selected as desired from contour convergence results with respect to a plurality of frames to facilitate prediction of tracking results. The results of automatic contour extraction and automatic tracking to each of preceding and subsequent frames in a plurality of frames are stored to enable selection of an optimum extraction result.

The number of blocks, area information or shape information is used as a feature amount to enable an initial contour setting frame to be automatically selected by a simple method. It is possible to fully automatically extract an object by performing automatic extraction of a contour from the frame and automatic tracking to each of preceding and subsequent frames.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing method, comprising:
   a) a selection step of selecting a specific frame from a plurality of frames of moving image data;
   b) a generation step of generating an initial contour corresponding to an extraction target in the frame selected in said selection step;
   c) a convergence step of converging the initial contour to the contour of the extraction target; and
   d) a control step of setting an initial contour corresponding to the extraction target in an other frame on the basis of the result of convergence in said convergence step, and effecting convergence to the contour of the extraction target on the basis of the set initial contour,
   wherein, in said control step, frames preceding and subsequent to the selected frame with respect to time can be set as the other frame.

2. A method according to claim 1, wherein said generation step includes a division step of dividing the selected frame into a plurality of blocks, a detection step of detecting an amount of motion of each of the blocks, a classification step of performing classification to select boundary blocks corresponding to the boundary between the extraction object and a background with which the extraction object exists, from the blocks on the basis of the amounts of motion detected in said detection step, and an initial contour generation step of generating the initial contour on the basis of the results of classification in said classification step.

3. A method according to claim 2, wherein said classification step comprises redividing the blocks and classifying the boundary blocks with respect to redivided blocks.

4. A method according to claim 2, wherein said classification step comprises classifying extraction target blocks corresponding to the extraction target and background blocks corresponding to the background with which the extraction target exists.

5. A method according to claim 4, wherein said classification step comprises classifying at least one of the extraction object blocks and the background blocks adjacent to each other as boundary blocks.

6. A method according to claim 3, wherein said classification step comprises redivision of the boundary blocks corresponding to the boundary between the extraction target and the background with which the extraction target exists.

7. A method according to claim 2, wherein the amount of motion is represented by a motion vector.

8. A method according to claim 7, wherein said classification step comprises classifying the boundary blocks according to the frequency of occurrence of the amounts of motion and a state of the adjacent blocks.

9. A method according to claim 2, wherein said initial contour generation step comprises generating the initial contour by using block edges of the boundary blocks, or straight lines or curves passing through points in the blocks.

10. A method according to claim 1, wherein said convergence step comprises setting the initial contour with an initial value of an active contour model and repeating convergence calculation so that an energy function defined in advance is minimized.

11. A method according to claim 1, wherein said selection step includes a feature amount detection step of obtaining a feature amount with respect to each of the plurality of frames, a discrimination step of comparing the feature amounts of the frames between the frames to discriminate a degree of similarity, and a setting step of setting as the specific frame one of the frames having a high degree of similarity discriminated in said discrimination step.

12. A method according to claim 11, wherein said feature amount detection step includes a division step of dividing a currently-processed frame into a plurality of blocks, a motion amount detection step of detecting an amount of motion of each of the blocks, a classification step of classifying the blocks into extraction target blocks corresponding to the extraction target, background blocks corresponding to a background with which the extraction target exists, and boundary blocks corresponding to the boundary between the extraction target and the background according to the amounts of motions detected in said feature amount detection step, and a step of obtaining a feature amount of the current frame according to the results of classification in said classification step.

13. A method according to claim 12, wherein the feature amount of the current frame comprises the number of the extraction target blocks, the number of the background blocks, or the ratio of the extraction target blocks and the background blocks.

14. A method according to claim 12, wherein the feature amount of the current frame comprises the area of the extraction target based on the extraction target blocks, the area of the background based on the background blocks, or the ratio of the area of the extraction target based on the extraction target blocks and the area of the background based on the background blocks.

15. A method according to claim 12, wherein the feature amount of the current frame comprises the perimeter of the extraction target based on the extraction target blocks, a rectangle circumscribed about the extraction target based on the extraction target blocks, the maximum distance between pairs of points on the periphery of the extraction target blocks, or a combination of the maximum and the minimum distance between the pairs of points on the periphery of the extraction target blocks.

16. A method according to claim 12, wherein said classification step comprises redividing the blocks and classifying the blocks with respect to redivided blocks.

17. A method according to claim 11, wherein said feature amount detection step includes a division step of dividing a currently-processed frame into a plurality of blocks, a motion amount detection step of detecting an amount of motion of each of the blocks, a classification step of classifying the blocks into extraction target blocks corresponding to the extraction target, background blocks corresponding to a background with which the extraction target exists, and boundary blocks corresponding to the boundary between the extraction target and the background according to the amounts of motions detected in said feature amount detection step, an initial contour generation step of generating an initial contour with respect to the extraction target on the basis of results of classification in said classification step, an initial contour convergence step of converting the initial contour to the contour of the extraction target, and a step of obtaining a feature amount of the current frame from the contour converged in said initial contour convergence step.

18. A method according to claim 17, wherein said initial contour generation step comprises generating the initial contour by using block edges of the boundary blocks, or straight lines or curves passing through points in the blocks.

19. A method according to claim 17, wherein said initial contour convergence step comprises setting the initial contour with an initial value of an active contour model and repeating convergence calculation so that an energy function defined in advance is minimized.

20. A method according to claim 1, further comprising an encoding step of encoding image data of the extraction target with respect to each of the frames on the basis of the result of contour convergence in said control step.

21. A method according to claim 20, wherein said encoding step comprises performing encoding in accordance with an MPEG-4 encoding system.

22. An image processing method comprising:
a) a generation step of generating an initial contour in each of a plurality of frames of moving image data;
b) a selection step of selecting the initial contour in specific one of the frames from the initial contours generated in the frames in said generation step;
c) a convergence step of converging the initial contour in the selected frame to the contour of an extraction target; and
d) a control step of setting an initial contour corresponding to the extraction target in an other frame on the basis of the result of convergence in said convergence step, and effecting convergence to the contour of the extraction target on the basis of the set initial contour,
wherein, in said control step, frames preceding and subsequent to the selected frame with respect to time can be set as the other frame.

23. A method according to claim 22, wherein said generation step includes a division step of dividing the selected frame into a plurality of blocks, a motion amount detection step of detecting an amount of motion of each of the blocks, a classification step of performing classification to select boundary blocks corresponding to the boundary between the extraction object and a background with which the extraction object exists, from the blocks of the frame on the basis of the amounts of motion detected in said motion amount detection step, and an initial contour generation step of generating the initial contour on the basis of the results of classification in said classification step.

24. A method according to claim 23, wherein said classification step comprises classifying extraction target blocks corresponding to the extraction target and background blocks corresponding to the background with which the extraction target exists.

25. A method according to claim 23, wherein the amount of motion is represented by a motion vector.

26. A method according to claim 22, wherein said convergence step comprises setting the initial contour with an initial value of an active contour model and repeating convergence calculation so that an energy function defined in advance is minimized.

27. A method according to claim 22, further comprising an encoding step of encoding image data on the extraction target with respect to each of the frames on the basis of the result of contour convergence in said control step.

28. A method according to claim 27, wherein said encoding step comprises performing encoding in accordance with an MPEG-4 encoding system.

29. An image processing method comprising:
a) a generation step of generating an initial contour in each of a plurality of frames of moving image data;
b) a convergence step of converging the initial contour in each frame to the contour of an extraction target;
c) a selection step of selecting a specific frame from the contours in the frames converged in said convergence step;
d) a control step of setting an initial contour corresponding to the extraction target in an other frame on the basis of the result of contour convergence in the selected frame, and effecting convergence to the contour of the extraction target on the basis of the set initial contour,
wherein, in said control step, frames preceding and subsequent to the selected frame with respect to time can be set as the other frame.

30. A method according to claim 29, wherein said generation step includes a division step of dividing the selected frame into a plurality of blocks, a motion amount detection step of detecting an amount of motion of each of the blocks, a classification step of performing classification to select boundary blocks corresponding to the boundary between the extraction object and a background with which the extraction object exists, from the blocks of the frame on the basis of the amounts of motion detected in said motion amount detection step, and an initial contour generation step of generating the initial contour on the basis of the results of classification in said classification step.

31. A method according to claim 30, wherein said classification step comprises classifying extraction target blocks corresponding to the extraction target and background blocks corresponding to the background with which the extraction target exists.

32. A method according to claim 30, wherein the amount of motion is represented by a motion vector.

33. A method according to claim 29, wherein said convergence step comprises setting the initial contour with an initial value of an active contour model and repeating convergence calculation so that an energy function defined in advance is minimized.

34. A method according to claim 29, further comprising an encoding step of encoding image data on the extraction target with respect to each of the frames on the basis of the result of contour convergence in said control step.

35. A method according to claim 34, wherein said encoding step comprises performing encoding in accordance with an MPEG-4 encoding system.

36. An image processing method comprising:
   a) a generation step of generating an initial contour in each of a plurality of frames of moving image data;
   b) a convergence step of converging the initial contour in each frame to the contour of an extraction target;
   c) a control step of setting an initial contour corresponding to the extraction target in an other frame on the basis of the result of contour convergence in each frame, and effecting convergence to the contour of the extraction target on the basis of the set initial contour, wherein frame preceding and subsequent to the selected frame with respect to time are able to be set as the other frame; and
   d) a selection step of selecting a specific result from the convergence results relating to the other frame on the basis of the result of contour convergence in each frame.

37. A method according to claim 36, wherein said generation step includes a division step of dividing the selected frame into a plurality of blocks, a motion amount detection step of detecting an amount of motion of each of the blocks, a classification step of performing classification to select boundary blocks corresponding to the boundary between the extraction object and a background with which the extraction object exists, from the blocks of the frame on the basis of the amounts of motion detected in said motion amount detection step, and an initial contour generation step of generating the initial contour on the basis of the results of classification in said classification step.

38. A method according to claim 37, wherein said classification step comprises classifying extraction target blocks corresponding to the extraction target and background blocks corresponding to the background with which the extraction target exists.

39. A method according to claim 37, wherein the amount of motion is represented by a motion vector.

40. A method according to claim 36, wherein said convergence step comprises setting the initial contour with an initial value of an active contour model and repeating convergence calculation so that an energy function defined in advance is minimized.

41. A method according to claim 36, further comprising an encoding step of encoding image data of the extraction target with respect to each of the frames on the basis of the result of contour convergence in said control step.

42. A method according to claim 41, wherein said encoding step comprises performing encoding in accordance with an MPEG-4 encoding system.

43. An image processing method, comprising:
   a) an input step of inputting a plurality of frames of moving image data;
   b) a selection step of selecting specific one of the plurality of frames; and
   c) an extraction step of extracting image data of a desired object from frames in the direction from the specific frame to a frame preceding the specific frame with respect to time and in the direction from the specific frame to a frame subsequent to the specific frame with respect to time.

44. A method according to claim 43, wherein said selection step comprises selecting specific one of the frames according to a motion based on the moving image data.

45. A method according to claim 43, further comprising an encoding step of encoding the image data of the object on the basis of the result of extraction in said extraction step.

46. A method according to claim 45, wherein said encoding step comprises executing encoding in accordance with an MPEG-4 encoding system.

47. An image processing apparatus, comprising:
   a) selection means for selecting a specific frame from a plurality of frames of moving image data;
   b) generation means for generating an initial contour corresponding to an extraction target in the frame selected by said selection means;
   c) convergence means for converging the initial contour to the contour of the extraction target; and
   d) control means for setting an initial contour corresponding to the extraction target in an other frame on the basis of an output from said convergence means, and for effecting convergence to the contour of the extraction target on the basis of the set initial contour, wherein said control means can set frames preceding and subsequent to the selected frame with respect to time as the other frame.

48. An image processing apparatus comprising:
   a) generation means for generating an initial contour in each of a plurality of frames of moving image data;
   b) selection means for selecting the initial contour in specific one of the frames from the initial contours generated in the frames by said generation means;
   c) convergence means for converging the initial contour in the selected frame to the contour of an extraction target; and
   d) control means for setting an initial contour corresponding to the extraction target in an other frame on the basis of an output from said convergence means, and for effecting convergence to the contour of the extraction target on the basis of the set initial contour, wherein said control means can set frames preceding and subsequent to the selected frame with respect to time as the other frame.

49. An image processing apparatus comprising:
   a) generation means for generating an initial contour in each of a plurality of frames of moving image data;
   b) convergence means for converging the initial contour in each frame to the contour of an extraction target;

c) selection means for selecting a specific frame from the contours in the frames converged by said convergence means;

d) control means for setting an initial contour corresponding to the extraction target in an other frame on the basis of the result of contour convergence in the selected frame, and for effecting convergence to the contour of the extraction target on the basis of the set initial contour, wherein said control means can set frames preceding and subsequent to the selected frame with respect to time as the other frame.

50. An image processing apparatus comprising:

a) generation means for generating an initial contour in each of a plurality of frames of moving image data;

b) convergence means for converging the initial contour in each frame to the contour of an extraction target;

c) control means for setting an initial contour corresponding to the extraction target in an other frame on the basis of the result of contour convergence in each frame, and for effecting convergence to the contour of the extraction target on the basis of the set initial contour, said control means being capable of setting frames preceding and subsequent to the selected frame with respect to time as the other frame; and d) selection means for selecting a specific result from the convergence results relating to the other frames on the basis of the result of contour convergence in each frame.

51. An image processing apparatus, comprising:

a) input means for inputting a plurality of frames of moving image data;

b) selection means for selecting specific one of the plurality of frames; and c) extraction means for extracting image data of a desired object from frames in the direction from the specific frame to a frame preceding the specific frame with respect to time and in the direction from the specific frame to a frame subsequent to the specific frame with respect to time.

52. A computer-readable storage medium storing image processing program codes stored thereon, said program codes comprising:

a) a code for a selection step of selecting a specific frame from a plurality of frames of moving image data;

b) a code for a generation step of generating an initial contour corresponding to an extraction target in the frame selected in said selection step;

c) a code for a convergence step of converging the initial contour to the contour of the extraction target; and d) a code for a control step of setting an initial contour corresponding to the extraction target in an other frame on the basis of the result of convergence in said convergence step, and effecting convergence to the contour of the extraction target on the basis of the set initial contour, wherein, in said control step, frames preceding and subsequent to the selected frame with respect to time can be set as the other frame.

53. A computer-readable storage medium storing image processing program codes stored thereon, said program codes comprising:

a) a code for a generation step of generating an initial contour in each of a plurality of frames of moving image data;

b) a code for a selection step of selecting the initial contour in specific one of the frames from the initial contours generated in the frames in said generation step;

c) a code for a convergence step of converging the initial contour in the selected frame to the contour of an extraction target; and d) a code for a control step of setting an initial contour corresponding to the extraction target in an other frame on the basis of the result of convergence in said convergence step, and effecting convergence to the contour of the extraction target on the basis of the set initial contour, wherein, in said control step, frames preceding and subsequent to the selected frame with respect to time can be set as the other frame.

54. A computer-readable storage medium storing image processing program codes stored thereon, said program codes comprising:

a) a code for a generation step of generating an initial contour in each of a plurality of frames of moving image data;

b) a code for a convergence step of converging the initial contour in each frame to the contour of an extraction target;

c) a code for a selection step of selecting a specific frame from the contours in the frames converged in said convergence step;

d) a code for a control step of setting an initial contour corresponding to the extraction target in an other frame on the basis of the result of contour convergence in the selected frame, and effecting convergence to the contour of the extraction target on the basis of the set initial contour, wherein, in said control step, frames preceding and subsequent to the selected frame with respect to time can be set as the other frame.

55. A computer-readable storage medium storing image processing program codes stored thereon, said program codes including:

a) a code for a generation step of generating an initial contour in each of a plurality of frames of moving image data;

b) a code for a convergence step of converging the initial contour in each frame to the contour of an extraction target;

c) a code for a control step of setting an initial contour corresponding to the extraction target in an other frame on the basis of the result of contour convergence in each frame, and effecting convergence to the contour of the extraction target on the basis of the set initial contour, wherein said code for a control step can set frames preceding and subsequent to the selected frame with respect to time as the other frame; and d) a code for a selection step of selecting a specific result from the convergence results relating to the other frame on the basis of the result of contour convergence in each frame.

56. A computer-readable storage medium storing image processing program codes stored thereon, said program codes comprising:

a) a code for an input step of inputting a plurality of frames of moving image data;

b) a code for a selection step of selecting specific one of the plurality of frames; and c) a code for an extraction step of extracting image data on a desired object from frames in the direction from the specific frame to a frame preceding the specific frame with respect to time and in the direction from the specific frame to a frame subsequent to the specific frame with respect to time.

* * * * *

UNITED STATES PATENT AND TRADEMARK OFFICE
CERTIFICATE OF CORRECTION

PATENT NO. : 6,810,079 B2
DATED : October 26, 2004
INVENTOR(S) : Osamu Itokawa

It is certified that error appears in the above-identified patent and that said Letters Patent is hereby corrected as shown below:

Column 4,
Line 58, "an" should be deleted.

Column 5,
Line 14, "an" should be deleted; and
Lines 34, 50 and 67, "in an" should read -- in --.

Column 8,
Lines 31 and 33, "in an" should read -- in --.

Column 9,
Line 28, "in an" should read -- in --; and
Line 52, "of" should be deleted.

Column 10,
Line 5, "Os 1" should read -- $O \leq s \leq 1$ --.

Signed and Sealed this

Eighth Day of March, 2005

JON W. DUDAS
*Director of the United States Patent and Trademark Office*